(12) United States Patent
Hamamoto

(10) Patent No.: US 11,743,523 B2
(45) Date of Patent: Aug. 29, 2023

(54) DISPLAY CONTROL SYSTEM AND DISPLAY INPUT MANAGEMENT METHOD

(71) Applicant: SHARP KABUSHIKI KAISHA, Sakai (JP)

(72) Inventor: Masanori Hamamoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/892,567

(22) Filed: Aug. 22, 2022

(65) Prior Publication Data
US 2023/0076723 A1 Mar. 9, 2023

(30) Foreign Application Priority Data
Sep. 8, 2021 (JP) .................. 2021-145996

(51) Int. Cl.
*H04N 5/268* (2006.01)
*H04N 21/258* (2011.01)
*H04N 21/4363* (2011.01)

(52) U.S. Cl.
CPC ....... *H04N 21/25825* (2013.01); *H04N 5/268* (2013.01); *H04N 21/4363* (2013.01)

(58) Field of Classification Search
CPC .. H04N 5/268; H04N 21/436; H04N 21/4363; H04N 21/43607; H04N 21/43615; H04N 21/25; H04N 21/258; H04N 21/25825
USPC .......... 348/705, 706; 725/59, 67, 68, 74, 93, 725/98, 100, 109, 110, 115, 116, 118, 725/131, 133–135, 139, 141–143, 145, 725/146, 148, 151, 153
See application file for complete search history.

(56) References Cited

U.S. PATENT DOCUMENTS

2016/0112651 A1* 4/2016 Miyamoto ............. G09G 5/006
348/705

FOREIGN PATENT DOCUMENTS

JP 2000-231369 A 8/2000

\* cited by examiner

*Primary Examiner* — Sherrie Hsia
(74) *Attorney, Agent, or Firm* — ScienBiziP, P.C.

(57) ABSTRACT

A management apparatus includes a connection request transmitter transmitting, to a display apparatus, a connection request requesting video signal acquisition by the display apparatus for each input type of video signal, a connectability determiner determining whether a connection to the display apparatus is available using a connection response acquired from the display apparatus for each input type of connection request, and a connectable input notifier informing an input type determined to be connectable. The display apparatus includes a connection switching processor executing a connection operation for acquiring a video signal corresponding to a requested input type, a connection switching confirmer determining whether acquisition of a video signal corresponding to the input type is successful by the connection operation, and a connection response transmitter transmitting a connection response including a connection result indicating whether acquisition of a video signal is successful that is determined to the management apparatus.

10 Claims, 17 Drawing Sheets

FIG. 4

INPUT TYPE
INFORMATION (INPS)  41

| COMMAND NUMBER | COMMAND NAME ID | CONNECTION INPUT TYPE NAME |
|---|---|---|
| 1 | INPS0001 | DVI-D |
| 2 | INPS0002 | D-SUB (RGB) |
| 3 | INPS0003 | D-SUB (VIDEO) |
| 4 | INPS0004 | HDMI1 |
| 5 | INPS0005 | HDMI2 |
| 6 | INPS0006 | HDMI3 |
| 7 | INPS0007 | DisplayPort1 |
| 8 | INPS0008 | DisplayPort2 |
| 9 | INPS0009 | USB |
| 10 | INPS0010 | TV |

FIG. 5

CONNECTION REQUEST INPUT 42

| 1 | COMMAND NAME | CONNECT |
|---|---|---|
| 2 | TRANSMISSION SOURCE APPARATUS ID | SV001 |
| 3 | TRANSMISSION DESTINATION DISPLAY APPARATUS ID | DISP02 |
| 4 | CONNECTION REQUEST INPUT | HDMI1 |

FIG. 6

CONNECTION RESPONSE INFORMATION 43

| 1 | COMMAND NAME | ANS |
|---|---|---|
| 2 | TRANSMISSION SOURCE DISPLAY APPARATUS ID | DISP02 |
| 3 | TRANSMISSION DESTINATION APPARATUS ID | SV001 |
| 4 | CONNECTION REQUEST INPUT | HDMI1 |
| 5 | CONNECTION RESULT | 1 (SUCCESS) |

FIG. 7

CONNECTION RESPONSE
INFORMATION 43

| 1 | COMMAND NAME | ANS |
|---|---|---|
| 2 | TRANSMISSION SOURCE DISPLAY APPARATUS ID | DISP02 |
| 3 | TRANSMISSION DESTINATION APPARATUS ID | SV001 |
| 4 | CONNECTION REQUEST INPUT | HDMI1 |
| 5 | CONNECTION RESULT | 0 (FAILURE) |

FIG. 8

CONNECTION RESPONSE DETERMINATION INFORMATION 44

| CONNECTION REQUEST No.(COMMAND NUMBER) | CONNECTION INPUT TYPE NAME | CONNECTION RESULT OF RECEIVED CONNECTION RESPONSE INFORMATION |
|---|---|---|
| 1 | DVI-D | ○ |
| 2 | D-SUB (RGB) | ○ |
| 3 | D-SUB (VIDEO) | ✖ |
| 4 | HDMI1 | ○ |
| 5 | HDMI2 | ✖ |
| 6 | HDMI3 | ○ |
| 7 | DisplayPort1 | ○ |
| 8 | DisplayPort2 | ✖ |
| 9 | USB | ○ |
| 10 | TV | ✖ |

| | |
|---|---|
| ○ | CONNECTION SUCCESS |
| ✖ | CONNECTION FAILURE |

FIG. 9

CONNECTABLE INPUT
INFORMATION 45

|   | CONNECTABLE INPUT TYPE NAME | CONNECTION DEVICE NAME |
|---|---|---|
| 1 | DVI-D | PC 1 |
| 2 | D-SUB (RGB) | PC 2 |
| 3 | HDMI1 | BD RECORDER |
| 4 | HDMI3 | HDMI (UNUSED) |
| 5 | DisplayPort1 | DVD PLAYER |
| 6 | USB | PC 3 |

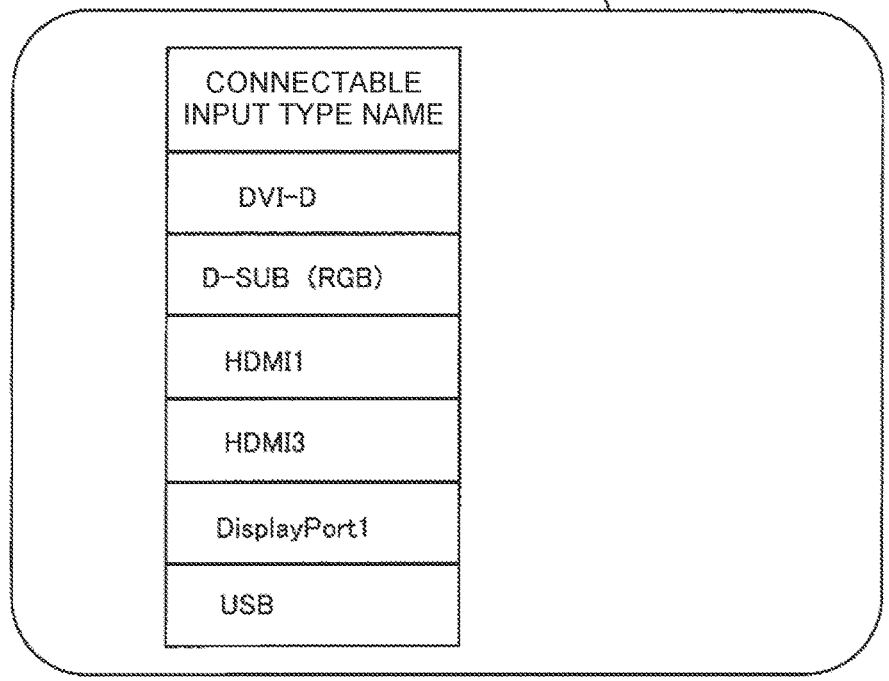
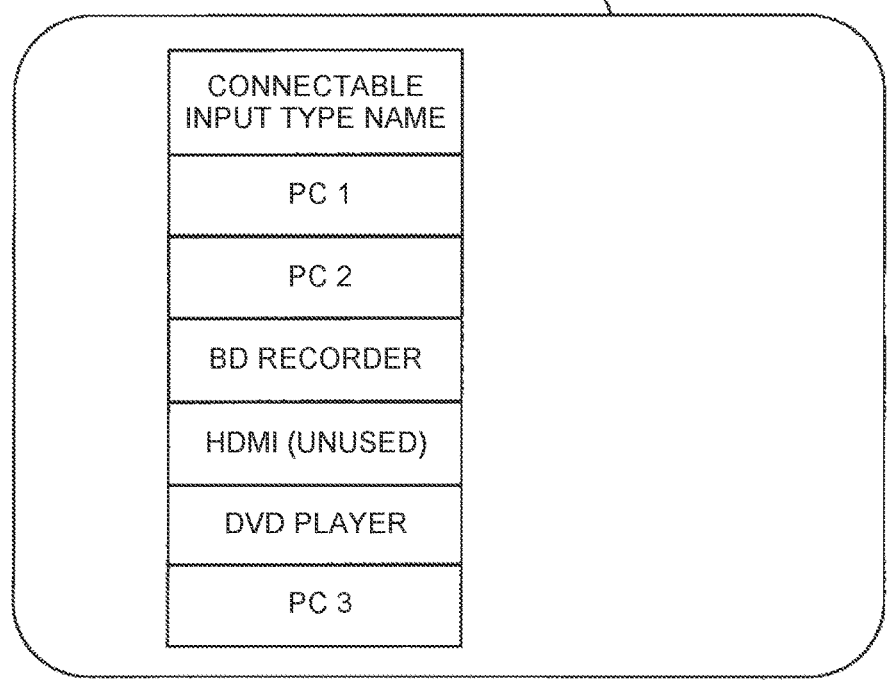

FIG. 11

INPUT TERMINAL
INFORMATION

| VIDEO INPUT TERMINAL | INPUT TYPE |
|---|---|
| T1 | D-SUB |
| T2 | DisplayPort |
| T3 | DVI-D |
| T4 | HDMI1 |
| T5 | HDMI2 |

DISPLAY APPARATUS
FUNCTION SETTING SCREEN

DISPLAY INPUT
CONFIRMATION SCREEN

CONNECTABLE INPUT LIST SCREEN

DISPLAY INPUT SWITCHING REQUEST SCREEN

DISPLAY CONTROL SYSTEM AND DISPLAY INPUT MANAGEMENT METHOD

BACKGROUND OF THE INVENTION

Field of the Invention

The present disclosure relates to display control systems, and particularly relates to a display control system and a display input management method that have a function of performing, on a display apparatus, switching of video signals of an image to be displayed on the display apparatus that has a plurality of video input terminals and that is capable of inputting video signals of a plurality of standards.

Description of the Background Art

In general, display apparatuses that have a plurality of video input terminals, that are capable of inputting video signals of a plurality of video standards, and that select desired video signals to display video images on a display panel have been used.
Furthermore, display input control systems are also used to connect a display apparatus to a personal computer and a server via a LAN (a local area network) or other networks and switch an input of signals of a video image to be displayed on the display apparatus by remote control from the personal computer or other devices.

For example, a display system is used in which a display apparatus is connected to a server via a network, video signals are input from a video signal generator, such as a VTR or a DVD, to the display apparatus, display data generated by the server and control data for controlling the display apparatus are transmitted from the server to the display apparatus, video signals generated based on the display data and video signals supplied from the video signal generator are switched from one to another in accordance with the control data supplied from the server in the display apparatus, and the video signals selected in accordance with an instruction from the server are displayed on a PDP (a plasma display panel).

However, even though general display apparatuses can be connected to a server via a network, some devices may not transmit types and the number of video input terminals included in the display apparatus to the server via data communication. Therefore, it may be difficult for the server to acquire information on the video input terminals of the display apparatuses.

Furthermore, in general display input control systems, in order to control switching of video signal inputs, it is necessary to store information on what video input terminals are available on a display apparatus and what devices are connected to which video input terminals, in advance, in a personal computer or a server.
For example, it was necessary for a server administrator to examine information on types and the number of video input terminals on each display apparatus connected to a server, and to perform an input operation to store the information in the server.

In a case where a server manages a number of display apparatuses, a long period of time and a large amount of effort are required for examining video input terminals of all the display apparatuses and inputting information on types of the video input terminals and the like by a server administrator, and therefore, a workload on the administrator for preparation before display input control of the display apparatus is performed is considerably large.

Furthermore, in a state in which types and the number of video input terminals of a display apparatus are not recognized by a server, when video signals input to the display apparatus are switched to input of standard video signals displayable in most types of display apparatus, the input switching control may be successfully performed.
However, when such control of switching to input of standard video signals is performed in a display apparatus that accepts input of only special video signals and does not accept input of standard video signals, the input switching fails. Furthermore, the server administrator may be required to visit a location where the display apparatus is installed so as to investigate a cause of the failure of the input switching.

Moreover, when the server administrator successively attempts an input switching operation for all standard video signals that are currently available by a remote operation in the server installed in a location different from the display apparatus in a state in which types and the number of video input terminals of the display apparatus are not recognized, input types of video signals displayable by the display apparatus may be detected.

However, every time the administrator unknowingly selects switching to input of video signals not supported by the display apparatus, the input switching fails, resulting in a large workload for the administrator who performs the unnecessary switching.
For example, assuming that there are 10 input types of standard video signals available in general display apparatuses, the administrator is required to attempt 10 types of input switching operation for a display apparatus in order to find input types for the display apparatus whose types of video input terminals are unknown. However, if there are only 3 input types of standard video signals that are actually displayable on the display apparatus, although 3 input types of input switching operation for video signals are successfully performed, the remaining 7 types of input switching operation for video signals fail.

Specifically, the administrator can confirm that there are only 3 input types for the standard video signals that can actually be displayed on the display apparatus only after attempting 10 different input switching operations, and therefore, the workload for the administrator is high because the administrator is required to perform the input switching operation also for the 7 input types that may not be used on the display apparatus.
Thus, sequential attempts of the input switching operations for a large number of usable video signals require a long period of time and a large amount of effort, and therefore, input types of displayable video signals may not be efficiently detected.

Accordingly, the present disclosure is made in view of the above circumstances, and is intended to avoid switching to input of video signals not provided in a display apparatus when an administrator of a server managing the display apparatus or a user of the display apparatus execute input switching control of the display apparatus without knowing types or the like of video signals that can be connected to the display apparatus. The present disclosure is further provided to reduce a period of time required for preliminary preparation work performed before execution of display input control of the display apparatus and to reduce a workload of the administrator or like persons.

SUMMARY OF THE INVENTION

According to an aspect of the present disclosure, a display control system includes a display apparatus and a management apparatus that are connected to each other through a network, the management apparatus performing a connection switching process on a video signal to be input from at least one connection device connected to the display apparatus to the display apparatus. The management apparatus includes a connection request transmitter that transmits, for each of individual input types of video signal to be used for display of an image, to the display apparatus, a connection request for requesting acquisition of a video signal corresponding to the input type by the display apparatus, a connection response acquirer that acquires a connection response transmitted from the display apparatus in response to the connection request, a connectability determiner that determines whether a connection to the display apparatus is available using a connection result included in the acquired connection response for each of the input types of the connection request, and a connectable input notifier that makes a notification indicating that a video signal corresponding to an input type determined to be connectable by the connectability determiner is a video signal for an input type that is available in the display apparatus. The display apparatus includes a connection switching processor that executes a connection operation for acquiring a video signal corresponding to an input type requested by a connection request transmitted from the management apparatus, a connection switching confirmer that determines whether acquisition of a video signal corresponding to the input type is successfully performed by the executed connection operation, and a connection response transmitter that transmits, for each connection request, to the management apparatus, the connection response including a connection result indicating whether acquisition of a video signal is successfully performed that is determined by the connection switching confirmer.

The management apparatus may include a storage that stores in advance input type information in which a plurality of input types of a video signal to be used for display of an image performed by the display apparatus are set. The connection request transmitter may sequentially transmit the connection requests corresponding to the input types set in the input type information to the display apparatus. The connection response acquirer may sequentially acquire connection responses returned from the display apparatus in response to the connection requests. The connectability determiner may determine whether the individual input types of a video signal set in advance in the input type information are connectable to the display apparatus. A video signal corresponding to an input type determined as connection failure may not be informed as a video signal of an input type that is available in the display apparatus.

The management apparatus may further include a connectable input generator. The connectability determiner may generate connection response determination information indicating successful connection or connection failure, for each input type requested to be connected, using a connection result included in the acquired connection response. The connectable input generator may generate connectable input information indicating that an input type determined as successful connection as connectable input information indicating the input type connectable to the display apparatus using the connection response determination information. The connectable input notifier may notify an administrator of the management apparatus of the connectable input information.

The management apparatus may further include an input name setter that sets and changes input types that are connectable in the display apparatus generated as the connectable input information into names of connection devices connected to the video input terminals that are provided in the display apparatus and that correspond to the connectable input types. When the input types are changed to the names of the connection devices as a setting, the connectable input notifier transmits the connectable input information including names of connection devices instead of the input types.

The management apparatus may further include a display, and the connectable input notifier may display the connectable input information on the display.

When the connectable input information is displayed on the display, the connectable input information may be displayed on the display in a state in which a desired input type corresponding to a video signal to be acquired by the display apparatus or a desired connection device that outputs a video signal to be acquired by the display apparatus is selectable, among the input types or the connection device names included in the displayed connectable input information.

The display control system may further include an information processing apparatus connected to the management apparatus via the network. The connectable input notifier of the management apparatus may transmit the connectable input information to the information processing apparatus. The information processing apparatus may notify an owner of the information processing apparatus of the received connectable input information.

According to another aspect of the present disclosure, a management apparatus is connected to a display apparatus through a network and performs a connection switching process on a video signal to be input to the display apparatus from at least one connection device. The management apparatus includes a connection request transmitter that transmits, for each of individual input types of video signal to be used for display of an image, to the display apparatus, a connection request for requesting acquisition of a video signal corresponding to the input type by the display apparatus, a connection response acquirer that acquires, from the display apparatus, after the connection request is transmitted to the display apparatus, a connection response including a connection result obtained when the display apparatus executes, in response to the connection request, a connection operation for acquiring a video signal corresponding to an input type required by the connection result, a connectability determiner that determines whether a connection to the display apparatus is available using the connection result included in the acquired connection response for each input type of the connection request, and a connectable input notifier that makes a notification indicating that a video signal corresponding to an input type determined to be connectable, among all input types of the connection requests, is a video signal for an input type that is available in the display apparatus.

According to a further aspect of the present disclosure, a display control system includes a display apparatus and an information processing apparatus owned by a user of the display apparatus that are connected to each other through a network, the information processing apparatus performing a process of switching a connection of a video signal input from at least one connection device connected to the display apparatus to the display apparatus. The information processing apparatus includes a connection request transmitter that transmits, for each of individual input types of video signal to be used for display of an image, to the display apparatus, a connection request for requesting acquisition of a video signal corresponding to the input type by the display apparatus, a connection response acquirer that acquires a connection response transmitted from the display apparatus in response to the connection request, a connectability determiner that determines whether a connection to the display apparatus is available using a connection result included in the acquired connection response for each input type of the connection request, and a connectable input notifier that makes a notification indicating that a video signal corresponding to an input type determined to be connectable by the connectability determiner is a video signal for an input type that is available in the display apparatus. The display apparatus includes a connection switching processor that executes a connection operation for acquiring a video signal corresponding to an input type requested by a connection request transmitted from the information processing apparatus, a connection switching confirmer that determines whether acquisition of a video signal corresponding to the input type is successfully performed by the executed connection operation, and a connection response transmitter that transmits, for each connection request, to the information processing apparatus, the connection response including a connection result indicating whether acquisition of a video signal is successfully performed that is determined by the connection switching confirmer.

According to a still further aspect of the present disclosure, a display input management method of a display control system performs connection switching of a video signal to be input to a display apparatus, the display control system including the display apparatus that displays an image of a desired video signal that is selected from among video signals supplied from one or more connection devices and a management apparatus that performs a connection switching process on a video signal to be input from at least one connection device connected to the display apparatus to the display apparatus. The display input management method includes transmitting, for each of individual input types of video signal to be used for display of an image, by the management apparatus to the display apparatus, a connection request for requesting acquisition of a video signal corresponding to the input type by the display apparatus, acquiring, by the display apparatus, the connection request, executing, by the display apparatus, a connection operation for acquiring a video signal corresponding to an input type requested by the connection request transmitted from the management apparatus, determining whether the acquisition of a video signal corresponding to the input type is successfully performed by the executed connection operation, transmitting, by the display apparatus to the management apparatus, a connection response including a connection result indicating whether the confirmed video signal is to be acquired for each connection request, acquiring, by the management apparatus from the display apparatus, a connection response including a connection result obtained as a result of a connection operation performed by the display apparatus from the display apparatus, determining whether a connection to the display apparatus is available for each input type of the connection request, using a connection result included in the obtained connection response, and making a notification indicating that a video signal corresponding to an input type determined to be connectable, among all input types of the connection requests, is a video signal of an input type that is available in the display apparatus.

According to the present disclosure, after the management apparatus transmits, for each of individual input types of video signal to be used for display of an image, to the display apparatus, a connection request for requesting acquisition of a video signal corresponding to the input type by the display apparatus, a connection response transmitted from the display apparatus is acquired, it is determined whether a connection to the display apparatus is available based on the acquired connection response for each of the input types of the connection request, and a notification indicating that a video signal corresponding to an input type determined to be connectable is a video signal for an input type that is available in the display apparatus is transmitted. Accordingly, when an administrator of the management apparatus managing the display apparatus, a user of the display apparatus, or the like person receives the notification, switching to an input of a video signal that is not provided in the display apparatus is prevented to be performed by the administrator or the like and a period of time required for a preparation operation before execution of display input control on the display apparatus can be reduced and a workload of the administrator or the like can be reduced.

BRIEF DESCRIPTION OF THE DRAWINGS

FIG. 4 is a diagram illustrating input type information stored in a storage of the management apparatus according to the embodiment of the present disclosure.

FIG. 5 is a diagram illustrating connection request information stored in the storage of the management apparatus according to the embodiment of the present disclosure.

FIG. 6 is a diagram illustrating connection response information stored in the storage of the management apparatus according to the embodiment of the present disclosure.

FIG. 7 is a diagram illustrating connection response information stored in the storage of the management apparatus according to the embodiment of the present disclosure.

FIG. 8 is a diagram illustrating connection response determination information stored in the storage of the management apparatus according to the embodiment of the present disclosure.

FIG. 9 is a diagram illustrating connectable input information stored in the storage of the management apparatus according to the embodiment of the present disclosure.

FIG. 10A is a diagram illustrating a connectable input display displayed on a display of the management apparatus according to the embodiment of the present disclosure.

FIG. 10B is a diagram illustrating a connectable input display displayed on the display of the management apparatus according to the embodiment of the present disclosure.

FIG. 11 is a diagram illustrating input terminal information stored in the storage of the display apparatus according to the embodiment of the present disclosure.

DESCRIPTION OF THE PREFERRED EMBODIMENTS

Figure 1:
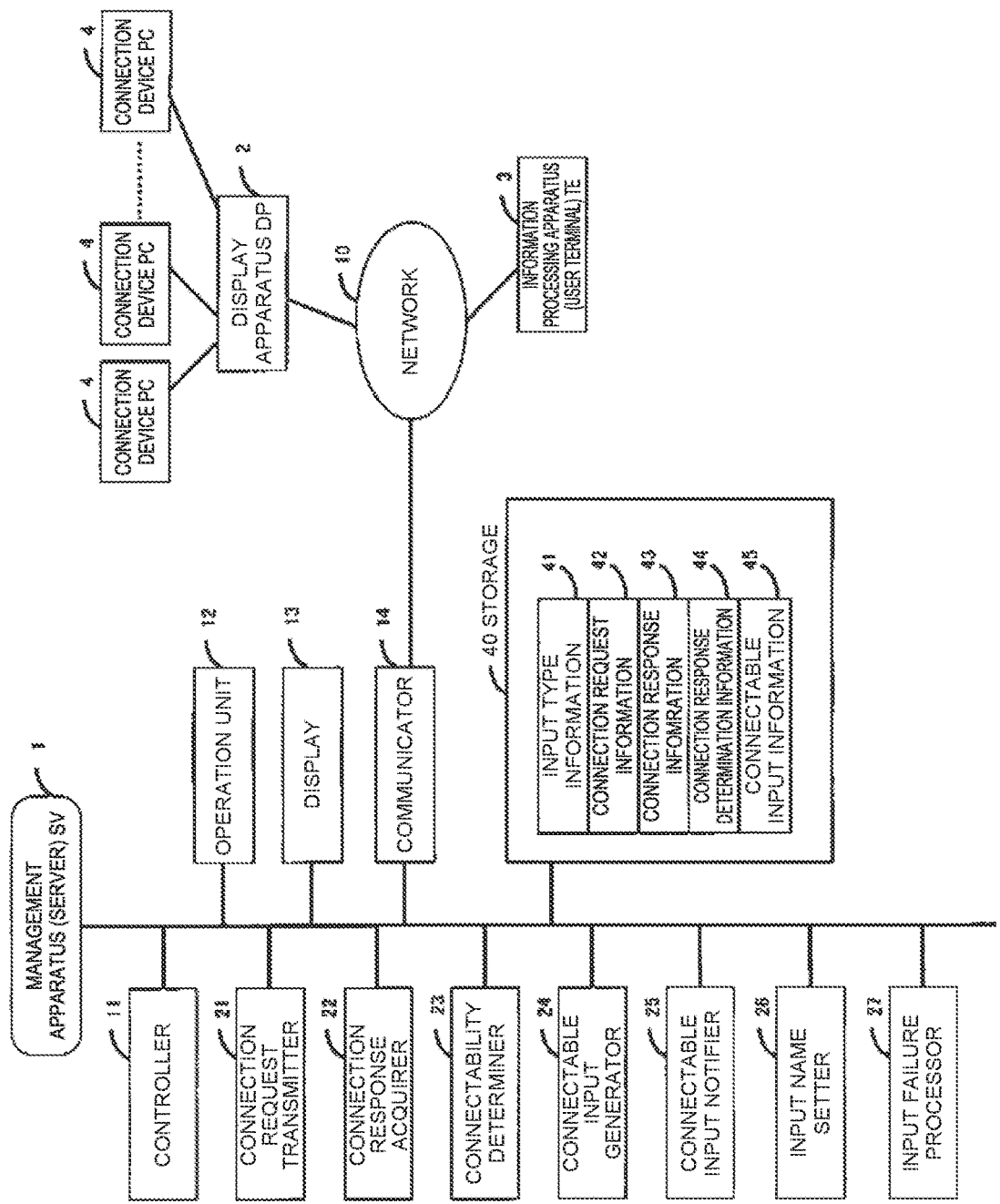
FIG. 1 is a block diagram illustrating a configuration of a management apparatus according to an embodiment of the present disclosure.

An embodiment of the present disclosure will be described below with reference to the accompanying drawings. The description of the embodiment below does not limit the present disclosure.
A display control system that performs connection switching of video signals to be input to a display apparatus will be described in the present disclosure.
Furthermore, the display control system mainly includes the display apparatus and a management apparatus (hereinafter referred to as a server where appropriate) connected to each other via a network, and the management apparatus performs a connection switching process for video signals to be input to the display apparatus from one or more connection devices connected to the display apparatus.

The display apparatus displays an image by one desired video signal selected from among video signals input from one or more electronic devices (hereinafter referred to as connection devices where appropriate).
The management apparatus selects a desired video signal from among the video signals to be input to the display apparatus from the one or more connection devices connected to the display apparatus, and displays an image based on the selected one video signal on the display apparatus.

Alternatively, the display control system may include an information processing apparatus owned by a user of the display apparatus. The information processing apparatus is connected via the network to the management apparatus and the display apparatus.

In the present disclosure, in particular, the management apparatus automatically repeats an attempt of a connection request operation for a plurality of predetermined input types on the display apparatus so as to determine types of connectable inputs provided in the display apparatus in a state in which types and the number of connectable inputs (video input terminals) of the display apparatus connected to the management apparatus through the network, types of the electronic devices connected to the display apparatus, video input terminals connected to the electronic devices are not recognized.
This process of repeatedly attempting the connection request operation for the plurality of predetermined input types and determining the types of connectable inputs is referred to as a connection input confirmation process.

In the attempt of the connection request operation, when the display apparatus performs a connection (switching) for an input type of a video signal requested to be connected and has successfully performed the connection (the switching) in response to a connection request transmitted to the display apparatus, the display apparatus determines that the input type is a connectable input, and otherwise, the display apparatus determines that the input type is a connection unavailable input.
By repeatedly performing such a connection request operation for the plurality of input types, input types that are successfully connected (switched) and input types that fail to be connected (switched) are distinguished among the plurality of predetermined input types of video signals. Therefore, types and the number of connectable inputs (video input terminals) that may be used in the display apparatus are acquired according to the input types that are successfully connected (switched).

An administrator of the management apparatus selects a desired input type from among the acquired connectable input types that are usable in the display apparatus so as to display an image on the display apparatus in accordance with a desired video signal without failure of an input connection of the video signal.
The information processing apparatus is a personal computer or a mobile terminal (hereinafter referred to as a "user terminal") owned by the user. When the user performs a predetermined input operation on the information processing apparatus, a connection switching operation of inputs of video signals output from the connection devices connected to the display apparatus is performed through the management apparatus.

In addition, as described below, the management apparatus transmits information (connectable input information) associated with types of connectable inputs usable in the display apparatus generated by the management apparatus to the information processing apparatus, and the information processing apparatus notifies the owner of the information processing apparatus of the received connectable input information using an information transmission method, such as display or data communication. The owner of the information processing apparatus checks the connectable input information that is displayed, for example, so as to recognize input types of video signals usable by the display apparatus. Furthermore, the owner of the information processing apparatus may also select a desired input type from among the connectable input types that are usable by the display apparatus, and accordingly, an image may be displayed on the display apparatus in accordance with a video signal output from a desired connection device without failing to perform an input connection of a video signal.

Furthermore, the information processing apparatus owned by the user of the display apparatus may execute the connection input confirmation process of the management apparatus described above.
In this case, the display control system is constituted by the display apparatus and the information processing apparatus connected to each other via the network, and the information processing apparatus directly acquires types of connectable inputs (video input terminals) usable in the display apparatus from the display apparatus, and the information processing apparatus performs the connection switching process of a video signal to be input to the display apparatus from one or more connection devices connected to the display apparatus.

Configuration of Management Apparatus

FIG. 1 is a block diagram illustrating a configuration of the management apparatus according to the embodiment of the present disclosure.

As described above, the management apparatus (the server: SV) 1 performs a connection process and a switching process for a video signal to be input to the display apparatus connected through the network.

In FIG. 1, the management apparatus (server: SV) 1 of the present disclosure mainly includes a controller 11, an operation unit 12, a display 13, a communicator 14, a connection request transmitter 21, a connection response acquirer 22, a connectability determiner 23, a connectable input generator 24, a connectable input notifier 25, an input name setter 26, an input failure processor 27, and a storage 40.

The controller 11 controls operations of individual components, such as the operation unit 12 and the connection request transmitter 21, and is primarily implemented by a microcomputer including a CPU, a ROM, a RAM, an I/O controller, and a timer.

The CPU organically activates various types of hardware based on control programs prestored in a nonvolatile memory, such as the ROM, so as to execute a connection request transmission function, a connectability determination function, and the like of the present disclosure.

Furthermore, among the above components, the connectability determiner 23 and the connectable input generator 24 are functional blocks in which the CPU executes respective processes based on predetermined programs.

The operation unit 12 is an input apparatus for an administrator of the management apparatus SV to perform predetermined input operations. For example, the operation unit 12 is a portion for inputting information, such as characters, and selecting and inputting a function, and a keyboard, a mouse, a touch panel, and the like, are used as the operation unit 12. Keys operated by the administrator include an operation start key, a function selection key, and a setting key.

The user, for example, inputs settings, such as information on a type of a display input managed by the management apparatus by performing an input operation on the touch panel or the setting key.

The display 13 is a portion for displaying information and displays information required for executing the various functions, results of execution of the functions, and the like for the user. For example, an LCD, an organic EL display, or the like, is used and, when a touch panel is used as the operation unit 12, the display 13 and the touch panel are provided in a superimposed manner.

The display 13 displays setting information of setting items managed by the management apparatus, a display input confirmation screen, a connectable input list screen, and a display input switching request screen, for example, by characters, symbols, graphics, images, icons, animations, moving images, and the like.

The communicator 14 is used for data communication with a display apparatus (DP) 2 and an information processing apparatus (TE) 3 through a network 10.

As shown in FIG. 1, the management apparatus (server, SV) 1 is connected to the display apparatus (DP) 2 via the network 10, and, as described below, transmits a connection request for a predetermined input type to the display apparatus 2 so as to perform a process of determining a connectable input of the display apparatus 2 and connection switching control of the display input of the display apparatus 2. Moreover, the management apparatus (server, SV) 1 is also connected to the information processing apparatus (TE) 3 which is a user terminal owned by the user, and as described below, transmits, to the information processing apparatus 3, connectable input information representing a list of input types connectable to the display apparatus 2.

Furthermore, the display apparatus (DP) 2 includes video input terminals as described below, and one or more connection devices (PC) 4 are connected to the video input terminals.

The information processing apparatus (TE) 3 that is a personal computer or a mobile terminal owned by the user who intends to use the display apparatus 2 selects a video input terminal to which a video image to be displayed on the display apparatus 2 is to be input from among a plurality of video input terminals connected to the display apparatus 2, for example, and selects a connection device (PC) 4 that outputs a video image to be displayed on the display apparatus 2 from among connection devices (PC) 4 connected to the display apparatus 2.

The user who attempts to use the display apparatus 2 can select a desired input type and a desired connection device with ease from among connectable input types indicated by the connectable input information even though the user does not recognize connectable input types and connectable connection devices 4 of the display apparatus 2 to be used, when the connectable input information transmitted from the management apparatus 1 is displayed as described below.

As the network 10, any existing communications network including a local area network (LAN) and a wide area network, such as the Internet, may be used, and both wired and wireless communication methods may be used.

The connection request transmitter 21 is used to transmit a connection request to the display apparatus 2.

In particular, when the display apparatus 2 includes a plurality of video input terminals and accepts input of video signals of a plurality of standards, a connection request requesting that video signals corresponding to individual input types are acquired by the display apparatus 2 for individual types of the plurality of video signals used for display of an image is transmitted to the display apparatus 2. The connection request transmitted to the display apparatus 2 includes connection request information described below.

The connection request information is used to select a type of display input (input type) provided in the display apparatus 2. Based on the received connection request information, the display apparatus 2 displays a video signal supplied from a connection device connected to a video input terminal associated with a selected display input type on a display panel of the display apparatus 2, based on the received connection request information.

The connection request information includes, for example, a command name, a transmission source apparatus ID, a transmission destination display apparatus ID, and a connection request input, as described below with reference to FIG. 5.

The connection request input corresponds to an input type of a video signal, and includes a name of a display input type that is currently available, such as DVI-D, D-SUB, or HDMI (registered trademark).

The connection response acquirer 22 is used to acquire a connection response transmitted from the display apparatus 2 in response to the connection request described above. The connection response includes connection response information described below.

After the management apparatus 1 transmits the connection request to the display apparatus 2, the display apparatus 2 performs, in response to the received connection request, a connection operation for acquiring a video signal corresponding to the input type requested by the connection request. Then the connection response acquirer 22 acquires the connection response that includes a connection result of the connection operation performed by the display apparatus 2 and that is transmitted from the display apparatus 2.

The connection response information is transmitted from the display apparatus 2 that has received the above connection request information, and includes information on the connection result.

The connection result is connectability information that indicates whether a switching process of switching a display input so that a video signal corresponding to a type of the display input (an input type) of the connection request is acquired has been successfully performed in the display apparatus 2 that has received the connection request information.

The connection response information includes, for example, a command name, a transmission source display apparatus ID, a transmission destination apparatus ID, an input type of the connection request (a connection request input), and a connection result (successful connection or connection failure) as described below with reference to FIGS. 6 and 7. As described below, connection response determination information is generated using the connection result (successful connection or connection failure) of the connection response information, and connectable input information is generated in accordance with display input types that have been successfully connected.

The connectability determiner 23 is used to determine whether each of the input types of the connection request is connectable to the display apparatus 2 using the connection result included in the connection response acquired by the connection response acquirer 22.

Since the obtained connection response includes the connection result of the connection response information, it is determined, using the connection result (successful connection or connection failure) of the connection response information, whether the connection by the input type of the connection request (the connection request input) is successfully performed. Specifically, the connectability determiner 23 uses the connection result included in the obtained connection response to make a connectability determination, and generates, for each input type of the connection request, connection response determination information 44 including the connection result indicating successful connection or connection failure.

An example of the connection response determination information 44 will be described below with reference to FIG. 8.

As described below, in the currently-used display apparatus 2, a connection input confirmation process of transmitting connection requests corresponding to respective input types to the display apparatus 2 is performed using the input type information 41 in which types of display input (input types) of a plurality of video signals to be used for displaying an image are set. The input type information 41 is set and stored in advance in the storage 40.

In the connection input confirmation process, first, the connection request transmitter 21 described above sequentially transmits connection requests corresponding to the individual input types set in the input type information 41 to the display apparatus 2.

For example, the connection requests corresponding to the input types are transmitted in the order of names of the input types (connection input type names) stored in the input type information 41.

Second, the connection response acquirer 22 sequentially acquires connection responses returned from the display apparatus 2 in response to the connection requests.

Then, the connectability determiner 23 uses connection results included in the connection responses to determine whether the individual input types of video signal preset in the input type information 41 are connectable to the display apparatus 2 and generates connection response determination information 44 for individual connection input type names.

For example, in a case where 3 connection input type names, DVI-D, D-SUB, and HDMI, are stored in the input type information 41 in advance as types of display input (input types) connectable to the display apparatus 2, first, the connection request information in which DVI-D is set is transmitted from the management apparatus 1 to the display apparatus 2 as the input type requested to be connected (a connection request input).

The display apparatus 2 that has received the connection request information including DVI-D attempts a process of performing switching of a display input so as to acquire a video signal corresponding to DVI-D as the type of display input (the input type).

When the process of switching a display input is successfully performed, connection response information including a connection result indicating a successful connection is transmitted from the display apparatus 2 to the management apparatus 1.

In this case, in the connection response determination information 44, a connection result indicating a successful connection is stored in association with DVI-D that is the connection input type name.

On the other hand, when the process of switching a display input fails, connection response information including a connection result indicating connection failure is transmitted from the display apparatus 2 to the management apparatus 1.

In this case, in the connection response determination information 44, a connection result indicating connection failure is stored in association with DVI-D that is the connection input type name.

Subsequently, connection request information in which D-SUB set as an input type requested to be connected (a connection request input) is transmitted from the management apparatus 1 to the display apparatus 2. The display apparatus 2 that has received the connection request information including D-SUB attempts a process of performing switching of a display input so as to acquire a video signal corresponding to D-SUB as the type of display input.

When the process of switching a display input is successfully performed, connection response information including a connection result indicating a successful connection is transmitted from the display apparatus 2 to the management apparatus 1, and in the connection response determination information 44, the connection result indicating a successful connection is stored in association with D-SUB that is the connection input type name. On the other hand, when the process of switching a display input fails, connection response information including a connection result indicating connection failure is transmitted from the display apparatus 2 to the management apparatus 1, and in the connection response determination information 44, the connection result indicating connection failure is stored in association with D-SUB that is the connection input type name.

Subsequently, connection request information in which HDMI is set as an input type requested to be connected (a connection request input) is transmitted from the management apparatus 1 to the display apparatus 2. The display apparatus 2 that has received the connection request information including HDMI attempts a process of performing switching of a display input so as to acquire a video signal corresponding to HDMI as the type of display input.
When the process of switching a display input is successfully performed, connection response information including a connection result indicating a successful connection is transmitted from the display apparatus 2 to the management apparatus 1, and in the connection response determination information 44, the connection result indicating a successful connection is stored in association with HDMI that is the connection input type name. On the other hand, when the process of switching a display input fails, connection response information including a connection result indicating connection failure is transmitted from the display apparatus 2 to the management apparatus 1, and in the connection response determination information 44, the connection result indicating connection failure is stored in association with HDMI that is the connection input type name.

In addition to the three connection input type names, in a case where 10 types of connection input type name are set and stored in advance in the input type information 41 as types of display input connectable to the display apparatus 2, for example, 10 types of connection request information are automatically transmitted to the display apparatus 2 in sequence as the connection input confirmation process.
Here, using connection results included in the connection response information transmitted from the display apparatus 2 in response to the respective connection request information, the connection response determination information 44 stores the 10 different connection input type names associated with their respective connection results (successful connection or connection failure).
In this connection input confirmation process, the transmission of connection request information and the determination of a connection result are automatically performed on all the types of display input preset and prestored in the input type information 41, and accordingly, the administrator is not required to perform an operation of transmitting the connection request information corresponding to the individual input types, and accordingly, a burden of the administrator caused by the operation performed by the administrator to detect types of display input (input types) provided in the display apparatus 2 may be reduced.

In a case where a connection input type name stored in the input type information 41 in advance indicates an input type that is not available in the display apparatus 2, the display apparatus 2 transmits connection response information including a connection result indicating connection failure for connection request information corresponding to the connection input type name.
However, since the connection response information indicating connection failure is transmitted from the display apparatus 2, it can be automatically determined that the input type of the connection input type name may not be used in the display apparatus 2, and accordingly, the administrator is not required to perform an input operation for transmitting connection request information indicating connection failure in a state in which the administrator does not recognize connectability of the input type and an operational burden of the administrator may be reduced.

The connectable input generator 24 generates information indicating types of input connectable to the display apparatus 2.
The connectable input generator 24 generates input types determined as successful connection as information indicating input types connectable to the display apparatus 2 (connectable input information) using the connection response determination information 44 generated by the connectability determiner 23.
Information indicating a connectable input type (connectable input information 45) is, for example, information described below with reference to FIG. 9.

An input type included in the connectable input information 45 is information that has been confirmed to be actually connectable in the display apparatus 2.
Therefore, when the administrator transmits a connection request for any one of input types included in the connectable input information 45 after performing the connection input confirmation process, the connection request is always successful. Therefore, a video signal corresponding to the input type of the connection request is acquired by the display apparatus 2 and an image corresponding to the video signal is displayed on the display panel.

The connectable input notifier 25 makes a notification indicating information on input types actually connectable in the display apparatus 2. For example, the connectable input notifier 25 notifies the user that a video signal corresponding to the input type determined as connectable by the connectability determiner 23 among all input types requested to be connected is a video signal of the input type available in the display apparatus 2.
Furthermore, the connectable input notifier 25 notifies the administrator of the management apparatus 1 and the user of the display apparatus 2 of the connectable input information 45 generated by the connectable input generator 24 described above.
However, a video signal corresponding to an input type determined as connection failure will not be notified as a video signal of an input type available in the display apparatus 2.

The connectable input notifier 25 may also include a connectable input display, which is not shown.
The connectable input display displays information indicating an input type actually connectable in the display apparatus 2 in the display 13 of the management apparatus 1.
The information indicating an input type actually connectable in the display apparatus 2 may be displayed using the connectable input information 45 described above.

Notification of the information indicating an input type actually connectable in the display apparatus 2 may be made by printing the information on a certain sheet when a printer is connected to the management apparatus 1, instead of the display on the display 13.
Alternatively, when a speaker is connected to the management apparatus 1, the notification of content of the connectable input information 45 may be made by sound.
Furthermore, in order to make a notification to the administrator of the management apparatus 1 and the user of the display apparatus 2, the information indicating an input type actually connectable in the display apparatus 2 may be transmitted to the information processing apparatus 3 owned by the administrator or the user or may be transmitted to another information processing apparatus 3 using another communication method, such as a facsimile.

In principle, the information indicating connectable input types is displayed on the display 13 with a name of a video signal display standards connectable in the display apparatus 2 (e.g., DVI-D, D-SUB, HDMI, USB, and other input type names).

FIGS. 10A and 10B are diagrams illustrating connectable input display displayed on the display 13 of the management apparatus 1 according to the embodiment of the present disclosure.

For example, a connectable input display screen as the one shown in FIG. 10A is displayed.

In FIG. 10A, information indicating connectable input types is displayed as a list of connectable input type names.

However, when the names of display standards of video signals are difficult for the user of the display apparatus 2 or the administrator of the management apparatus 1 to understand, the administrator may change the setting of displayed content to names of connection devices (connection device names), by using an input name setter 26 described later.

For example, in a case where the connection device 4 connected to the video input terminal corresponding to the connectable input type of DVI-D is the PC1, when "PC1" is set as a connection device name corresponding to the input type of DVI-D, "PC1" is displayed instead of DVI-D.

In this case, a connectable input display screen as illustrated in FIG. 10B is displayed.

In FIG. 10B, information indicating connectable input types is displayed as a list of connectable input device names.

Furthermore, when the connectable input information 45 may be displayed on the display 13 in a state in which a desired input type corresponding to a video signal to be acquired by the display apparatus 2 or a desired connection device 4 that outputs a video signal to be acquired by the display apparatus is selectable, among the input types or the connection device names included in the displayed connectable input information 45. By this, the administrator or the like person who checks the displayed connectable input information 45 can perform connection switching of a video signal with ease since a desired input type or a desired connection device 4 may be quickly selected.

The input name setter 26 changes the content of the connectable input display on the display 13.

For example, the input name setter 26 changes a setting of input types that are connectable in the display apparatus 2 and generated as the connectable input information 45 to names of connection devices 4 connected to video input terminals that are provided in the display apparatus 2 and that correspond to the respective connectable input types.

When the input types are changed to the names of the connection devices as the setting, the connectable input notifier 25 makes a notification of the connectable input information 45 including the names of the connection devices instead of the input types.

As described above, the connectable input display on the display 13 lists the names of the connectable input types. Furthermore, in general, the video input terminals of the display apparatus 2 have respective names of display standards of video signals input thereto, and therefore, the input types may be recognized when the video input terminals to which the connection devices actually connected are checked. However, since the names of connection devices connected to the video input terminals are often easier to understand for the user and the administrator of the management apparatus 1 than the names of the input types, displaying the names of the connection devices rather than the names of the input types makes the connection operation and the switching operation for the display input easier and reduces the burden of the connection operation for the user and failure of the switching operation of the display input.

Therefore, the user or the administrator of the management apparatus 1 performs setting and inputting of the names of the connection devices (connectable device names) connected to the video input terminals of the display apparatus 2 such that the names of the connection devices correspond to the input types (connectable input type names) of the video input terminals of the display apparatus 2.

For example, after the display of connectable inputs as shown in FIG. 10A, portions corresponding to the displayed connectable input type names may be changed to the connectable device names by an input operation performed by the user or the like person.

An example of connectable input display that displays the connectable device names instead of the input types (the connectable input type names) is described below with reference to FIG. 10B.

The user or the administrator of the management apparatus 1 who views the connectable input display as shown in FIG. 10B can easily display an output video image output from a desired one of the connection devices in a switching manner when recognizing the connection devices connected to the video input terminals, even if the user or the administrator forget or does not know the input types of the video input terminals (the connectable input type names) of the display apparatus.

The input failure processor 27 utilizes the connectable input information 45 of the display apparatus 2 to detect failure of a video input terminal corresponding to an input type included in the connectable input information 45.

As described above, since the connection input types included in the connectable input information 45 are information obtained as a result of the determination that the connection input types are actually connectable in the display apparatus 2, when connection requests are transmitted for the individual connection input types, connection requests are always successful, and therefore, a video signal corresponding to any one of the input types of the connection requests is acquired by the display apparatus 2, and an image is to be displayed on the display panel in accordance with the video signal.

However, when a connection request is transmitted for a given connection input type after the connectable input information 45 is determined, the connection request may fail due to a poor connection or damage of the video input terminal.

In a case where the user, etc. actually attempts to use the display apparatus 2, when a connection request fails in an operation of switching a connection input type, a video image of the input type may not be displayed, which will be disadvantageous for the user or the like person.

Therefore, the above connection input confirmation process is periodically executed (e.g., every day or every week) to automatically and sequentially transmit connection requests for all the connectable input types to the display apparatus 2 and connection results (successful connection or connection failure) for all the input types are acquired.

After the connection results (successful connection or connection failure) are acquired, the connection results of the connection response determination information 44 stored in the storage 40 are compared with the acquired connection results.

As a result of the comparison, when both the connection results match each other, it can be determined that there is no input type for which the connection request fails, and that no failure is present for all the connectable input types.

On the other hand, when, as a result of the comparison, both the connection results do not match each other and at least one of the connection results for the connection input types included in the connectable input information 45 is "connection failure", it can be determined that failure has occurred at a corresponding one of the video input terminals of the input types.

Thus, when it is determined that failure has occurred in the connection input type included in the connectable input information 45, the name of the connection input type or the name of the connection device corresponding to the video input terminal where the failure has occurred is displayed in the display 13 of the management apparatus 1.

By displaying the input type in which the failure has occurred, it is possible to notify the administrator of the management apparatus 1 of the occurrence of the failure and a failure portion.

Alternatively, the name of the connection input type or the connection device name corresponding to the video input terminal where the failure has occurred may be transmitted to the information processing apparatus 3 (the user terminal) owned by the administrator of the management apparatus 1 or a manager in a location where the display apparatus 2 is installed.

As described above, since the connection input confirmation process is periodically executed so that connection results (successful connection or connection failure) for all the input types connectable to the display apparatus 2 are acquired, the possibility of disadvantage for the user or the like person may be reduced and failure of the video input terminal of the display apparatus may be found in an earlier stage and the failure may be corrected.

The storage 40 stores information and programs required for executing individual functions of the management apparatus 1 according to the present disclosure, and a semiconductor storage device, such as a ROM, a RAM, or a flash memory, a storage device, such as an HDD or an SSD, or other storage media, is used.

The storage 40 stores, for example, the input type information 41, the connection request information 42, the connection response information 43, the connection response determination information 44, and the connectable input information 45.

The input type information 41 sets and stores the display input types available in the display apparatus 2 in advance. Although examples of the display input types (connection input types) available in the display apparatus 2 include input types corresponding to commonly-used general display standards, such as DVI-D, D-SUB, and HDMI, as described above, an input type corresponding to a special video input signal different from such input types may be included.

FIG. 4 is a diagram illustrating an example of the input type information 41 stored in the storage 40 of the management apparatus 1. In the input type information 41 (INPS) in FIG. 4, connection input type names which mean names of the display input types, command numbers, and command names are associated with one another.

The command names correspond to identification names (command names) included in the connection requests when connection requests for the respective input types of the connection input type names are transmitted.

The input type information 41 in FIG. 4 includes 10 connection input type names.

For example, a connection input type name with a command number 1 is "DVI-D", and when a connection request for "DVI-D" is transmitted, an identification name (a command name) included in the connection request is "INPS0001".

Furthermore, when the connection input confirmation process is executed as described above, connection requests for the input types of the individual connection input type names in the input type information 41 in FIG. 4 are sequentially transmitted to the display apparatus 2.

As for the input type information 41 in FIG. 4, 10 pieces of connection request information are sequentially transmitted to the display apparatus 2.

However, the input type information 41 is not limited to the 10 connection input type names shown in FIG. 4 but may define and store other input types.

The connection request information 42 is included in the connection request transmitted from the management apparatus 1 to the display apparatus 2.

FIG. 5 is a diagram illustrating an example of the connection request information 42 stored in the storage 40 of the management apparatus 1.

The connection request information 42 in FIG. 5 includes a command name, a transmission source apparatus ID, a transmission destination display apparatus ID, and a connection request input.

The command name corresponds to an identification name indicating that data to be transmitted is a connection request, and "CONNECT" is set in FIG. 5.

However, when a connection request is actually transmitted, instead of "CONNECT", a command name corresponding to one of the connection input type names illustrated in FIG. 4 may be set.

For example, when a connection request corresponding to the connection input type name "D-SUB" is to be transmitted, "INPS0002" shown in FIG. 4 may be set as a command name.

The display apparatus 2 stores the command name IDs and the connection input type names in FIG. 4 in associated with each other in advance and a command name ID included in a received connection request is checked, so as to determine that a connection by an input type of the connection input type name corresponding to the command name ID is requested.

The transmission source apparatus ID is information for identifying the management apparatus 1 of a transmission source, and an identification ID of the management apparatus 1, a name of the management apparatus 1, or an IP address is set, for example.

The transmission destination display apparatus ID is information for identifying the display apparatus 2 of a transmission destination, and an identification ID of the display apparatus 2, a name of the display apparatus 2, or an IP address is set, for example.

The connection request input is information for specifying an input type to be connected.

However, when an input type to be connected may be specified by the command name included in the connection request information 42, the connection request input is not required.

The connection request information 42 in FIG. 5 is included in a connection request to be transmitted from the management apparatus 1 having a transmission source apparatus ID "SV001" to the display apparatus 2 having a transmission destination display apparatus ID "DISP02", and a connection request input thereof is "HDMI1".

When the connection request input is "HDMI1", "INPS0004" shown in FIG. 4 may be set as a command name.

The connection response information 43 is included in a connection response transmitted from the display apparatus 2 to the management apparatus 1.

After receiving a connection request from the management apparatus 1, the display apparatus 2 executes a connection process (or a switching process) on an input type requested to be connected and returns a connection response including a result of the execution of the connection process (a connection result) to the management apparatus 1 that has transmitted the connection request.

FIGS. 6 and 7 are diagrams illustrating examples of the connection response information 43 stored in the storage 40 of the management apparatus 1.

The connection response information 43 illustrated in FIGS. 6 and 7 includes a command name, a transmission source display apparatus ID, a transmission destination apparatus ID, a connection request input, and a connection result.

The command name corresponds to an identification name indicating that data to be transmitted is a connection response, and "ANS" is set in FIGS. 6 and 7.

The transmission source display apparatus ID is information for identifying a display apparatus of a transmission source and corresponds to the transmission destination display apparatus ID included in the connection request.

The transmission destination apparatus ID is information for identifying an apparatus of a transmission destination of the connection response and identifying the management apparatus 1 that has transmitted the connection request, and corresponds to the transmission source apparatus ID included in the connection request.

The connection request input is information for specifying an input type to be connected and corresponds to the connection request input included in the connection request.

The connection result is a result of execution of the connection process for the input type requested to be connected, and information indicating a successful connection (e.g., 1) or information indicating connection failure (e.g., 0) is set.

The connection response information 43 shown in FIG. 6 is obtained when the connection process is successfully performed for the input type requested to be connected.

Information indicating a successful connection (e.g., 1) is set in the connection result of the connection response information 43 in FIG. 6, the identification information "DISP02" of the display apparatus 2 is set in the transmission source display apparatus ID, the identification information "SV001" of the management apparatus 1 is set in the transmission destination apparatus ID, and "HDMI1" is set in the connection request input.

When the connection request input in the connection request information 42 shown in FIG. 5 is "HDMI1," the display apparatus 2 executes a connection process for the input type "HDMI1, and the connection response information 43 shown in FIG. 6 is generated when a video input terminal for "HDMI1" is detected, a video signal may be input from a connection device connected to the video input terminal, and a connection or switching to "HDMI1" is successfully performed.

The connection response information 43 shown in FIG. 7 is obtained when the connection process has failed for an input type requested to be connected.

In the connection response information 43 in FIG. 7, a transmission source display apparatus ID, a transmission destination apparatus ID, and a connection request input are the same as those in the connection response information 43 in FIG. 6. However, information indicating a connection failure (e.g., 0) is set in the connection result.

When receiving the connection response information 43 shown in FIG. 6 indicating the successful connection, the management apparatus 1 that has transmitted the connection request determines that a connection to the video input terminal of the input type "HDMI1" is available.

In this case, in the connection response determination information 44, information indicating the successful connection is set and stored in a connection result corresponding to the input type "HDMI1", and furthermore, the input type "HDMI1" is set and stored in the connectable input information 45.

On the other hand, when the connection response information 43 shown in FIG. 7 indicating the connection failure is received, it is determined that a connection to the video input terminal of the input type "HDMI1" is not available. In this case, in the connection response determination information 44, although information indicating the connection failure is set and stored in the connection result corresponding to the input type "HDMI1", the input type "HDMI1" is not set and stored in the connectable input information 45.

The connection response determination information 44 is generated by the connectability determiner 23.

As described above, based on content of connection results in the connection response information 43 included in connection responses transmitted from the display apparatus 2, connection results corresponding to the individual connection input type names in the connection response determination information 44 are set and stored.

FIG. 8 is a diagram illustrating an example of the connection response determination information 44 stored in the storage 40 of the management apparatus 1.

The connection response determination information 44 in FIG. 8 includes a connection request number, a connection input type name, and a connection result of received connection response information.

The connection request number and the connection input type name in FIG. 8 are the information corresponding to the command number and the connection input type name shown in FIG. 4, respectively.

For example, a case where a connection request input in the connection response information 43 is "DVI-D" and a connection result is "successful connection (1)" corresponds to a connection input type name "DVI-D" in the connection response determination information 44.

It is assumed that information "success" meaning a successful connection is set and stored in the connection result.

Furthermore, when a connection request input of the connection response information 43 is "HDMI2" and a connection result is "connection failure (0)", information "failure" meaning connection failure is set and stored in the connection result corresponding to a connection input type name "HDMI2" in the connection response determination information 44, for example.

In the connection response determination information 44 in FIG. 8, examples of results of execution of the connection input confirmation process performed for 10 connection input types are stored, and six connection input types, "DVI-D", "D-SUB(RGB)", "HDMI1", "HDMI3", "DisplayPort1", and "USB" are determined as "successful connection" and the other connection input types are determined as "connection failure".

The connectable input information 45 is generated by the connectable input generator 24.

The connectable input information 45 is obtained by extracting the connection input type names corresponding to the connection result "successful connection" in the received connection response information from the connection response determination information 44 described above. FIG. 9 is a diagram illustrating an example of the connectable input information 45 stored in the storage 40 of the management apparatus 1. The connectable input information 45 in FIG. 9 indicates a case where the six connection input type names corresponding to "successful connection" that is set and stored in the connection response determination information 44 in FIG. 8 are stored as connectable input type names.

Furthermore, the connectable input information 45 of FIG. 9 includes information storing connection device names associated with the connectable input types when the input name setter 26 sets the connection device names in the connectable input type names.

Although the connectable input type names are stored in the connectable input information 45 in principle, when the connection device names are set, both the connectable input type names and the connection device names may be stored, or only the connection device names may be stored.

Configuration of Display Apparatus

Figure 2:
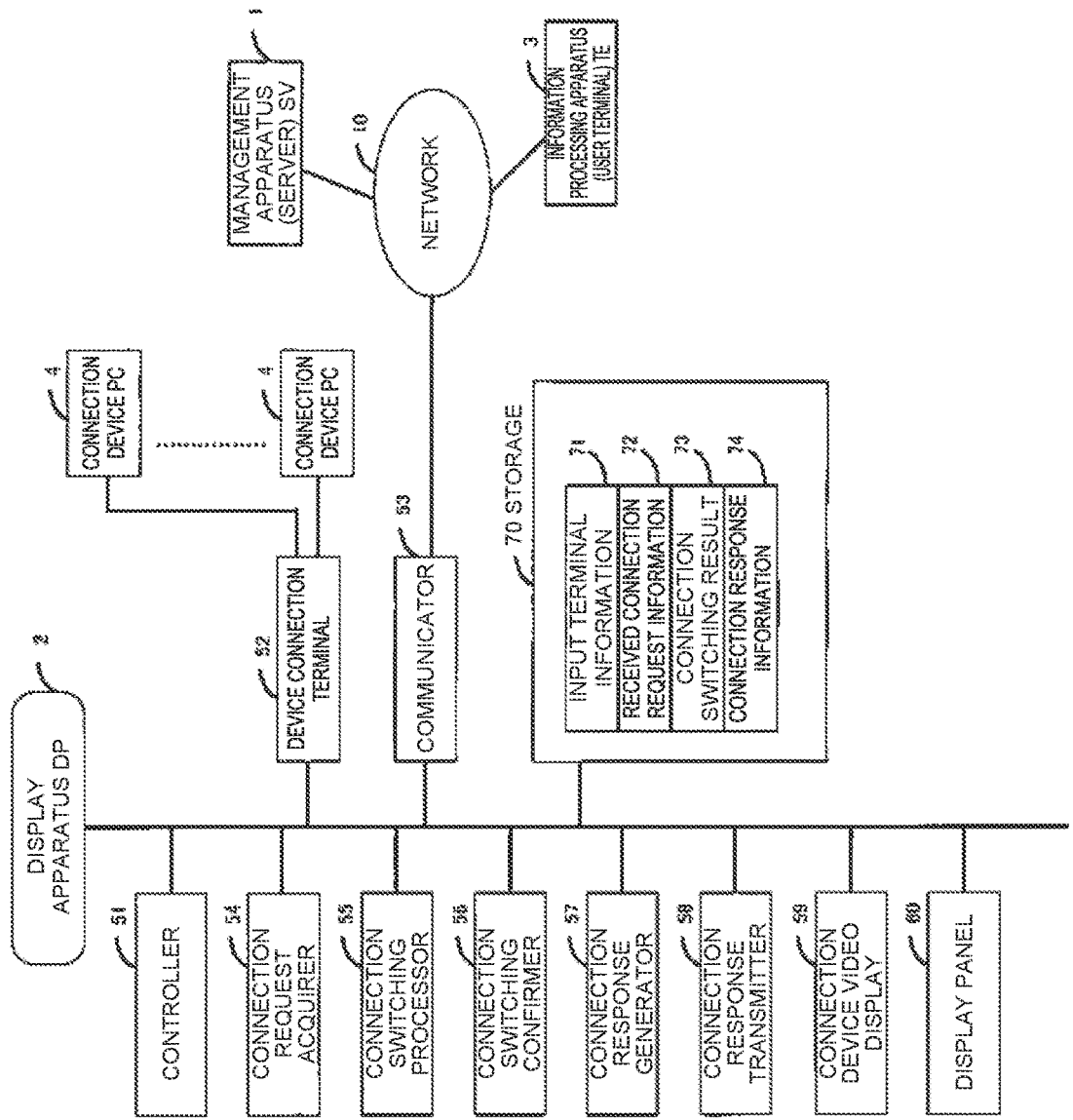
FIG. 2 is a block diagram illustrating a configuration of a display apparatus according to the embodiment of the present disclosure.

FIG. 2 is a block diagram illustrating a configuration of the display apparatus 2 according to the embodiment of the present disclosure.

The display apparatus 2 includes one or more video input terminals and displays, on the display panel, an image corresponding to a video signal selected from among video signals supplied from one or more connection devices connected to the display apparatus 2 through the one or more video input terminals.

In FIG. 2, the display apparatus (DP) 2 of the present disclosure mainly includes a controller 51, a device connection terminal 52, a communicator 53, a connection request acquirer 54, a connection switching processor 55, a connection switching confirmer 56, a connection response generator 57, a connection response transmitter 58, a connection device video display 59, a display panel 60, and a storage 70.

The controller 51 controls operations of the individual components, such as the communicator 53 and the connection switching processor 55, and is primarily implemented by a microcomputer including a CPU, a ROM, a RAM, an I/O controller, and a timer.

The CPU organically activates various types of hardware based on control programs prestored in a nonvolatile memory, such as the ROM, and executes a communication function, a connection switching function, and the like of the present disclosure.

Furthermore, among the above components, the connection request acquirer 54, the connection switching confirmer 56, and the connection response generator 57 are functional blocks in which the CPU executes respective processes based on predetermined programs.

The device connection terminal 52 is a portion that connects the connection device 4 to the display apparatus 2, and corresponds to the video input terminal described above. The display apparatus 2 has one or more video input terminals, and each of the video input terminals corresponds to a connector of a shape corresponding to a given video signal input type.

For example, when a video signal whose input type is D-SUB is input, a D-SUB connector is provided as a video input terminal, and a video signal corresponding to the input type of D-SUB is input to the display apparatus 2 via the D-SUB connector.

Furthermore, when a video signal whose input type is HDMI is input, an HDMI connector is provided as a video input terminal, and a video signal corresponding to the input type of HDMI is input to the display apparatus 2 via the HDMI connector.

In general, when N input types of video signal may be input to the display apparatus 2, in principle, the display apparatus 2 has N input connectors corresponding to the input types.

Figure 3:
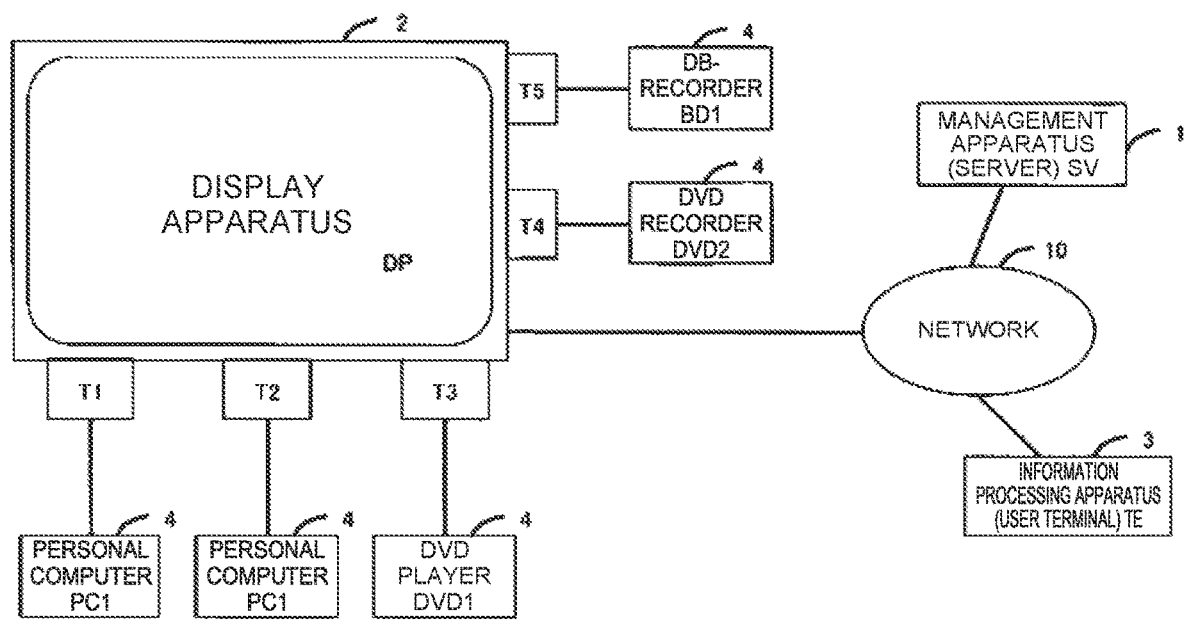
FIG. 3 is a diagram illustrating a connection form of the display apparatus and connection devices connected to the display apparatus.

FIG. 3 is a diagram illustrating a connection form of the display apparatus 2 and the connection devices 4 connected to the display apparatus 2.

The connection devices 4 are electronic devices mainly having a function of outputting a video signal for displaying a still image or a moving image. For example, as shown in FIG. 3, a personal computer PC1, a DVD player DVD1, a DVD recorder DVD2, a BD recorder BD1, etc. correspond to the connection devices 4.

Each of the connection devices 4 includes an output connector corresponding to a video output terminal for outputting a video signal corresponding to a given input type to the display apparatus 2.

The display apparatus 2 includes an input connector corresponding to a video input terminal for the same input type as the video output terminal so as to input a video signal output from the video output terminal.

By connecting the output connector and the input connector to each other by a communication cable, the video signal output from the connection device 4 is input to the display apparatus 2.

Among the connection devices 4, for example, the personal computer PC1 has a D-SUB connector and a DVI-D connector, and video signals corresponding to the input types of D-SUB and DVI-D are output to display apparatus 2 via the respective connectors.

Furthermore, the DVD recorder DVD2 having an HDMI connector outputs a video signal corresponding to the input type of HDMI to the display apparatus 2 via the HDMI connector.

In FIG. 3, an example of the display apparatus 2 having five video input terminals (T1 to T5) is illustrated. The five video input terminals (T1 to T5) in FIG. 3 are for inputting video signals corresponding to the respective input types shown in the FIG. 3.

Each of the video input terminals is constituted by an input connector corresponding to an input type of a video signal to be input, and a given connection device 4 is connected to the video input terminal.

Since the input types of the individual video input terminals are physically fixed, the correspondence between the video input terminals and the input types shown in FIG. 3 may be stored as input terminal information 71, as described below, in the storage 70 of the display apparatus 2.

In FIG. 3, the video input terminal T1 is for inputting a video signal corresponding to the input type of D-SUB, for example, and the personal computer PC1 is connected via the video input terminal T1.

Similarly, the video input terminal T2 is for inputting a video signal corresponding to an input type of DisplayPort, and the other video input terminals T3 to T5 are for inputting video signals corresponding to input types of DVI-D, HDMI1, and HDMI2, respectively.

For example, the DVD player DVD1 connected to the video input terminal T3 is a device having a function of outputting a video signal corresponding to the input type of DVI-D, and the DVD recorder DVD2 connected to the video input terminal T4 is a device having a function of outputting a video signal corresponding to the input type of HDMI1.

Since the present disclosure is characterized primarily by checking the input types of the plurality of video input terminals provided in the display apparatus 2 to determine connectable input types, it is assumed, in the following examples, that the display apparatus 2 has a plurality of video input terminals.

The communicator 53 is used for data communication with the management apparatus 1 and the information processing apparatus 3 through the network 10.

As shown in FIG. 2, the display apparatus (DP) 2 is connected to the management apparatus (SV) 1 via the network 10 and receives a connection request transmitted from the management apparatus 1.

A connection process (or a switching process) of connection to an input type corresponding to a connection request input included in the received connection request is executed. Furthermore, as a response to a connection request, the display apparatus 2 generates connection response information as described above and transmits a connection response including the connection response information to the management apparatus 1.

Alternatively, when the information processing apparatus (the user terminal) 3 owned by the user has a connection input confirmation function, as with the management apparatus 1, the display apparatus 2 may receive a connection request transmitted from the information processing apparatus 3 and transmit a connection response in response to the connection request to the information processing apparatus 3. In this case, information communication may be directly performed between the display apparatus 2 and the information processing apparatus 3 via the communicator 53, without using the management apparatus 1.

The information processing apparatus 3 having the connection input confirmation function includes, as with the management apparatus 1, functions corresponding to a connection request transmitter that transmits a connection request to the display apparatus 2, a connection response acquirer that acquires a connection response transmitted from the display apparatus 2, a connectability determiner that determines connectability in the display apparatus 2 for each input type requested to be connected, a connectable input notifier that makes a notification indicating that a video signal corresponding to an input type determined to be connectable is a video signal of an available input type, and a connectable input generator that generates connectable input information.

As the network 10, any existing communication network may be used including a wide area network, such as the internet, or a LAN, and any of both wired and wireless communication methods may be used.

The connection request acquirer 54 acquires a connection request transmitted from the management apparatus 1.

The acquired connection request includes connection request information including a command name and a connection request input as described above, and an input type requested to be connected can be specified by checking content of the command name and the connection request input. Alternatively, when the information processing apparatus (the user terminal) 3 owned by the user has a connection input confirmation function, as with the management apparatus 1, the connection request acquirer 54 may receive a connection request transmitted from the information processing apparatus 3 without using the management apparatus 1.

The connection request information that has received is stored in the storage 70 as received connection request information 72.

The connection switching processor 55 executes a connection operation of acquiring a video signal corresponding to an input type requested by a connection request transmitted from the management apparatus 1.

The display apparatus 2 includes one or more video input terminals to connect the connection devices as described above, and the connection process for connection to a video input terminal, among the video input terminals included in the display apparatus 2, or the switching process for switching to the video input terminal is performed so that a video signal can be acquired through the video input terminal corresponding to the input type requested by the connection request acquired by the connection request acquirer 54.

As described above, since an input type requested to be connected can be specified by the connection request input or the command name included in the acquired connection request, a video input terminal corresponding to the specified input type is selected, a video signal is acquired through the selected video input terminal, and an image corresponding to the video signal is displayed on the display panel 60.

However, when the display apparatus 2 does not originally include a video input terminal corresponding to the input type requested by the acquired connection request, the connection process (or the switching process) may not be executed.

Furthermore, even in a case where the display apparatus 2 includes a video input terminal corresponding to the input type requested by the acquired connection request, when the video input terminal fails for some reason and therefore may not acquire a video signal through the video input terminal, the connection process (or the switching process) fails.

For example, the fact that the video input terminal itself fails can be confirmed by the management apparatus 1 when a prescribed confirmation command is transmitted from the management apparatus 1 to the display apparatus 2 and a response indicating failure is received from the display apparatus 2.

Similarly, the fact that the connection process (or the switching process) has failed while the video input terminal is normal can be confirmed by the management apparatus 1 when a prescribed confirmation command is transmitted from the management apparatus 1 to the display apparatus 2 and a response indicating connection failure is received from the display apparatus 2.

The connection switching confirmer 56 checks whether a video signal corresponding to an input type is successfully acquired by the connection operation (the connection process or the switching process) executed by the connection switching processor 55.

After checking whether the video signal has been successfully acquired by the connection operation, the connection switching confirmer 56 temporarily stores a connection result (corresponding to a connection switching result 73 described below) indicating whether the video signal has been successfully acquired in the storage 70.

The determination as to whether the video signal has been successfully acquired may be made by executing the confirmation process described above, for example.

Furthermore, in a case where a process of switching to a video signal (a display input) to be displayed corresponding to DVI-D is successfully performed when the display apparatus 2 includes a video input terminal capable of inputting a video signal corresponding to DVI-D, a video signal output form a connection device connected to the video input terminal corresponding to DVI-D is input and may be displayed on the display panel 60.

Therefore, when the display apparatus 2 can confirm, by a change in a waveform of the video signal or other means, that the video signal output from the connection device 4 has been input after the switching process of switching to the display input of DVI-D is performed, it may be determined that the process of switching the display input has been successfully performed.

When it is determined that the connection process or the like has been successfully performed, information indicating a successful connection is temporarily stored in association with the input type successfully connected as a connection switching result 73.

On the other hand, when it is determined that the connection process or the like has failed, information indicating connection failure is temporarily stored in association with the input type of the connection failure as the connection switching result 73.

The temporarily-stored connection switching result 73 is used as a connection result included in the connection response information generated by the connection response generator 57 described below.

The connection response generator 57 generates connection response information to be transmitted to the management apparatus 1.

As shown in FIGS. 6 and 7 above, the connection response information 74 includes a connection result (successful connection or connection failure) corresponding to the connection switching result 73 set therein.

Furthermore, in the connection response information 74, identification information (an IP address, etc.) of the display apparatus 2 is set in a transmission source display apparatus ID, identification information (an IP address, etc.) of the management apparatus 1 that has transmitted a connection request is set in a transmission destination apparatus ID, and an input type requested to be connected is set in a connection request input.

However, when a connection request transmitted from the information processing apparatus 3 is received, identification information (an IP address, etc.) of the information processing apparatus 3 is set in the transmission destination apparatus ID of the connection response information 74.

The connection response transmitter 58 transmits a connection response to the management apparatus 1 for each connection request via the communicator 53.

The connection response includes the connection response information 74 which is a connection result indicating whether a video signal confirmed by the connection switching confirmer 56 can be acquired.

However, when receiving a connection request transmitted from the information processing apparatus 3, the connection response transmitter 58 transmits a connection response to the information processing apparatus 3.

When the connection process for connection to the video input terminal corresponding to the input type required to be connected is successfully performed, the connection device video display 59 acquires an image based on a video signal output from the connection device 4 connected to the video input terminal of the successful connection and displays the image in the display panel 60.

For example, when the user performs an operation of selecting a desired connection device 4 that outputs video data desired to be viewed or an operation of selecting a video input terminal connected to the connection device 4 using the information processing apparatus 3 owned by the user, an image output from the connection device 4 may be displayed on the display panel 60.

The display panel 60 is a component that displays images, and a display panel that is generally used, such as an LCD, a PDP, or an organic EL, can be used as the display panel 60.

The storage 70 stores information and programs required for executing individual functions of the display apparatus 2 according to the present disclosure, and is constituted by a semiconductor storage device, such as a ROM, a RAM, or a flash memory, a storage device, such as an HDD or an SSD, or other storage media.

The storage 70 stores, for example, the input terminal information 71, the received connection request information 72, the connection switching result 73, and the connection response information 74.

The input terminal information 71 stores in advance the correspondence between the video input terminals included in the display apparatus 2 and the respective input types as described above.

FIG. 11 is a diagram illustrating an example of the input terminal information 71 stored in the storage 70 of the display apparatus 2.

The input terminal information 71 in FIG. 11 represents the correspondence between 5 video input terminals and respective input types, similar to that illustrated in FIG. 3.

The received connection request information 72 corresponds to the connection request information 42 included in the received connection request and has the same data configuration as the connection request information 42 illustrated in FIG. 5.

The connection switching result 73 is obtained when the connection switching confirmer 56 determines whether the connection process or the switching process has been successfully performed by the connection switching processor 55.

As the connection switching result 73, information indicating a successful connection or information indicating connection failure is associated with an input type subjected to the connection process or the like, and the connection switching result 73 is temporarily stored in the storage 70.

The connection response information 74 is generated by the connection response generator 57, as described above, and has the data structure shown in FIG. 6.

Overview of Confirmation of Connection Inputs of Display Apparatus by Management Apparatus Here, an overview of an example of confirmation of connectable input types of the display apparatus 2 performed on the management apparatus 1 will be described using a screen displayed on the display 13 of the management apparatus 1. When the administrator of the management apparatus 1 does not recognize types of video input terminal (input types) included in the display apparatus 2, the connection input confirmation process is activated to recognize input types available in the display apparatus 2.

When the connection input confirmation process is activated, the connection process for connection to video input terminals corresponding to all input types assumed in advance is attempted on the display apparatus 2. After the connection process is attempted on all the input types, a connection response determination indicating a successful connection or connection failure is made on the individual input types, the connectable input information 45 indicating input types available in the display apparatus 2 is generated using the input types of the successful connection, and the generated connectable input information 45 is displayed on the display 13.

Figure 12A:
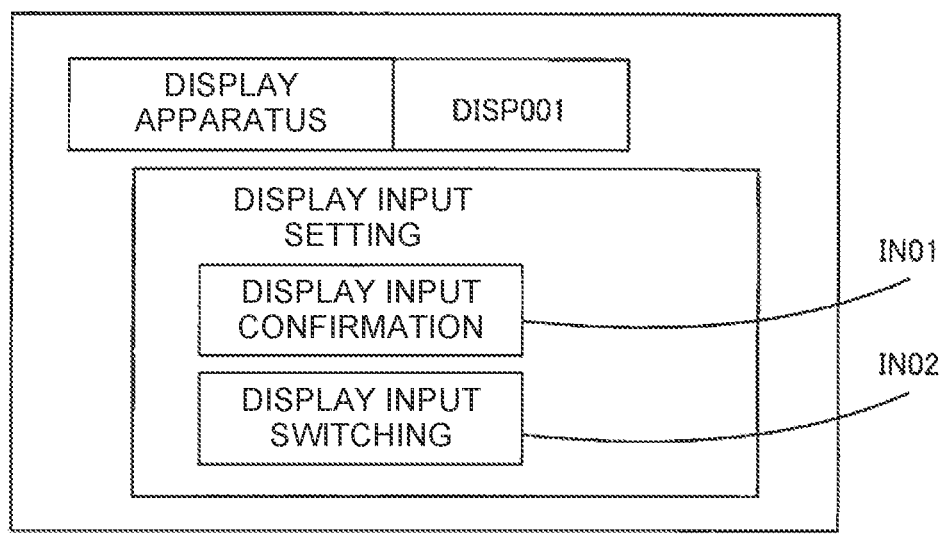
FIG. 12A is a diagram illustrating a display apparatus function setting screen displayed on the display of the management apparatus according to the embodiment of the present disclosure.

Display Apparatus Function Setting Screen: FIG. 12A

FIG. 12A is a diagram illustrating a display apparatus function setting screen displayed in the display 13 of the management apparatus 1 according to the embodiment of the present disclosure.

When the administrator of the management apparatus 1 performs an operation of activating the connection input confirmation process, the display apparatus function setting screen shown in FIG. 12A is displayed, for example.

in the display apparatus function setting screen in FIG. 12A, a region for displaying an identification name of the display apparatus 2 and a region for selecting a function of a display input setting are displayed. When "DISP001" is displayed in the region for displaying the identification name of the display apparatus 2 in FIG. 12A, a display apparatus having a name "DISP001" is currently selected.

In this case, the display apparatus having the name "DISP001" is a target of the connection input confirmation process.

When the administrator desires a change to another display apparatus, the administrator may enter an identification name of the display apparatus to execute the connection input confirmation process in the region displaying an identification name of a display apparatus or select and input a desired display apparatus from among connectable display apparatuses displayed in a list.

A region for selecting one of the two functions is displayed in the region for selecting a function of the display input setting shown in FIG. 12A.

Here, it is assumed that selection regions for "Display Input Confirmation" (IN01) and "Display Input Switching" (IN02) are displayed. "Display Input Confirmation" indicates a region to be selected when types of video input terminal (input types) provided in the display apparatus 2 are to be confirmed.

Figure 12B:
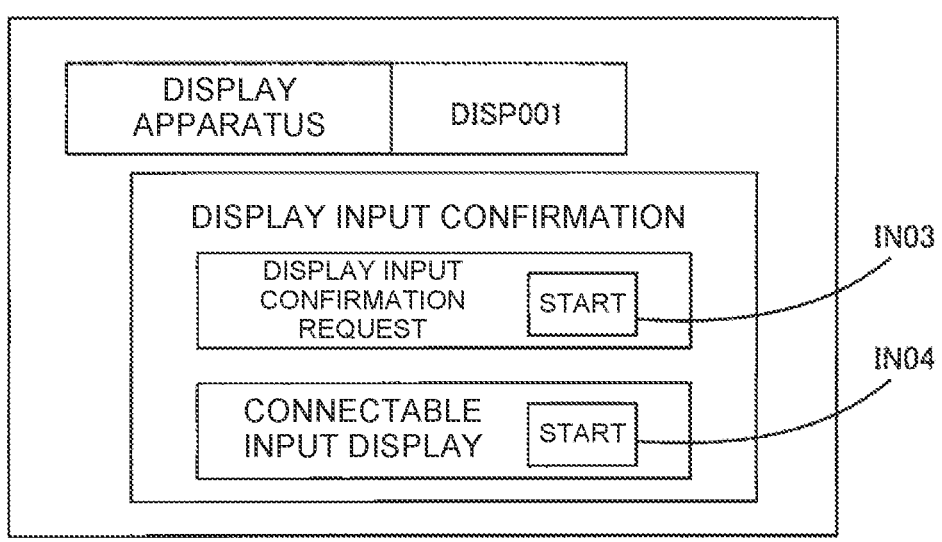
FIG. 12B is a diagram illustrating a display input confirmation screen displayed on the display of the management apparatus according to the embodiment of the present disclosure.

Specifically, when the region IN01 of "Display Input Confirmation" is selected, a display input confirmation screen shown in FIG. 12B is displayed and the connection input confirmation process may be started. Alternatively, the connection input confirmation process may be started immediately after the region IN01 of "Display Input Confirmation" is selected.

"Display Input Switching" is a region to be selected when a video input terminal used to acquire a video signal is selected for displaying an image on the display apparatus 2 after the types of video input terminal (the input types) included in the display apparatus 2 are confirmed.

Figure 13A:
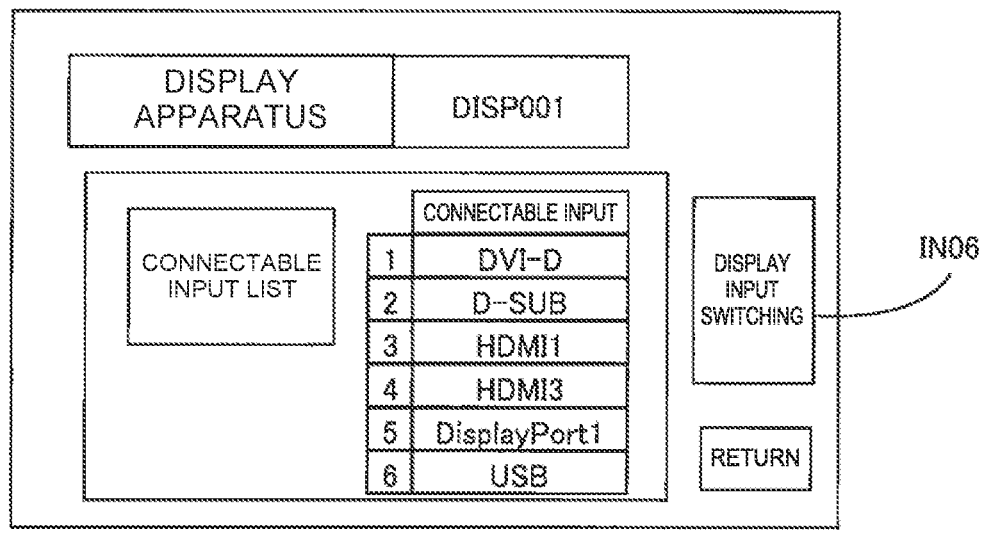
FIG. 13A is a diagram illustrating a connectable input list screen displayed on the display of the management apparatus according to the embodiment of the present disclosure.
Figure 13B:
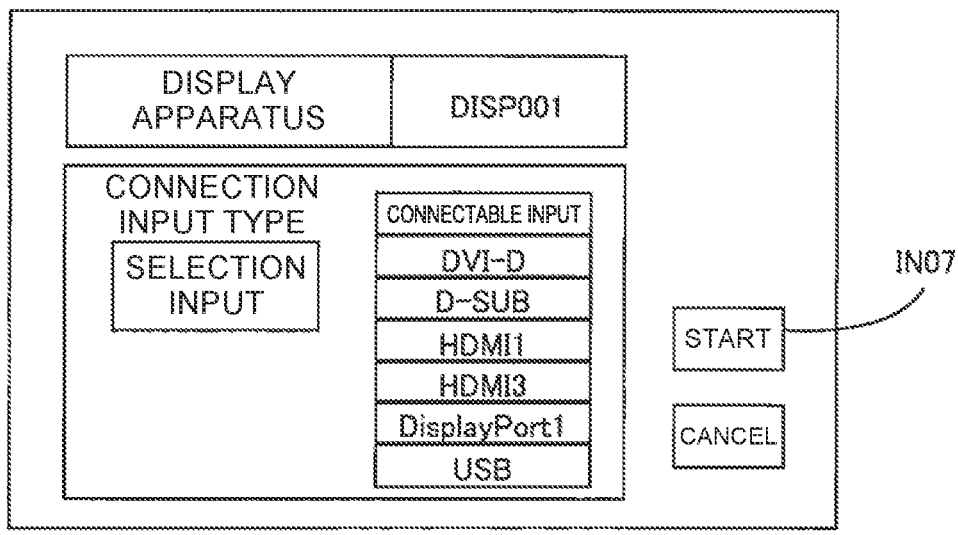
FIG. 13B is a diagram illustrating a display input switching request screen displayed on the display of the management apparatus according to the embodiment of the present disclosure.
Figure 13C:
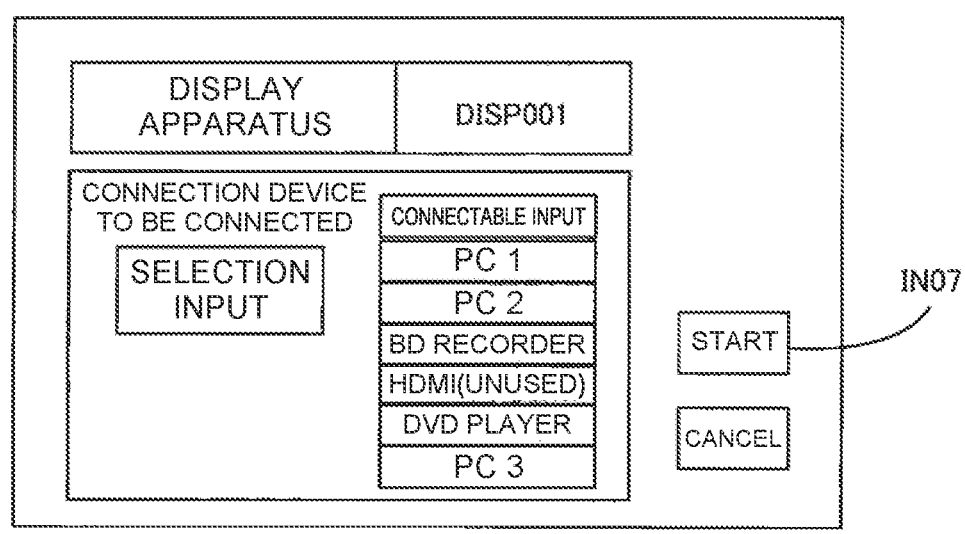
FIG. 13C is a diagram illustrating a display input switching request screen displayed on the display of the management apparatus according to the embodiment of the present disclosure.

Specifically, when the region IN02 of "Display Input Switching" is selected, a display input switching request screen shown in FIG. 13B or FIG. 13C is displayed and an input type may be selected to start the connection switching process.

Display Input Confirmation Screen: FIG. 12B

FIG. 12B is a diagram illustrating the display input confirmation screen displayed in the display 13 of the management apparatus 1 according to the embodiment of the present disclosure.

In the display input confirmation screen in FIG. 12B, a region for displaying an identification name of the display apparatus 2 and a region for selecting a function associated with the display input confirmation are displayed.

A region for displaying an identification name of a display apparatus 2 in FIG. 12B is the same as to the region in FIG. 12A.

A region for selecting one of two functions is displayed in the region for selecting a function associated with the display input confirmation in FIG. 12B.

Here, it is assumed that selection regions of "Display Input Confirmation Request" (IN03) and "Connectable Input Display" (IN04) are displayed.

"Display Input Confirmation Request" indicates a region to be selected when a process of confirming input types connectable to the display apparatus is to be performed on the display apparatus 2.

Specifically, when the administrator of the management apparatus 1 selects "Start" in the region IN03 of "Display Input Confirmation Request", a connection request corresponding to a given input type is transmitted to the display apparatus 2.

When a plurality of input types are to be attempted as shown in the input type information 41 of FIG. 4, the input types are automatically selected one by one in series, and connection requests corresponding to the respective input types are transmitted to the display apparatus 2.

After a connection response is received in response to the connection request, another one of the input types is automatically selected, a connection request for the input type is transmitted to the display apparatus 2, and a reception of a connection response that is returned in response to the connection request is waited.

Furthermore, when the connection response is received, one of the remaining input types is selected and a connection request corresponding to the input type is transmitted to the display apparatus 2. In this way, the transmission of a connection request and the reception of a connection response are automatically repeated.

For example, when the administrator of the management apparatus 1 only performs an operation of selecting "Start" in the region IN03 of "Display Input Confirmation Request", the transmission of a connection request and the reception of a connection response are automatically repeated for all the individual input types displayed in the input type information 41 of FIG. 4, and thereafter, the display input confirmation process is terminated.

Figure 12C:
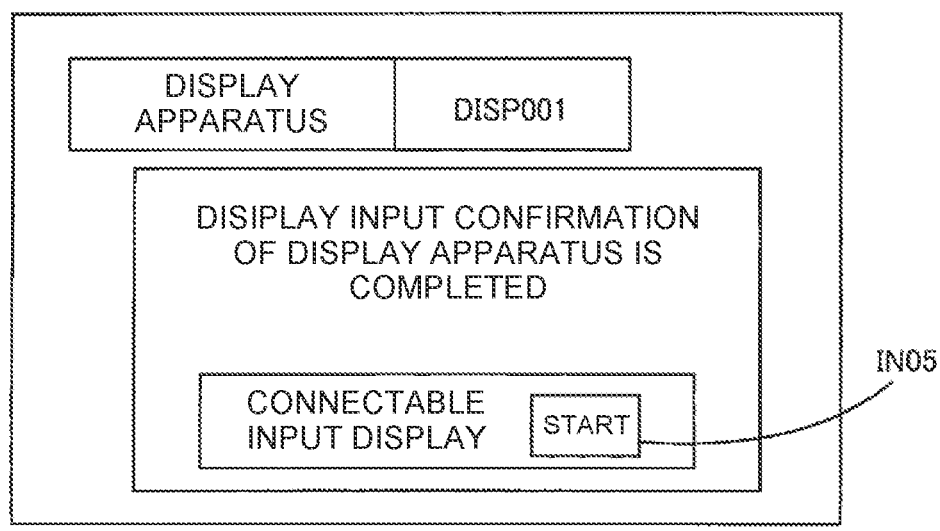
FIG. 12C is a diagram illustrating a display input confirmation completion screen displayed on the display of the management apparatus according to the embodiment of the present disclosure.

Display Input Confirmation Completion Screen: FIG. 12C

When the display input confirmation process is terminated, a display input confirmation completion screen shown in FIG. 12C is displayed.

FIG. 12C is a diagram illustrating the display input confirmation completion screen displayed in the display 13 of the management apparatus 1 according to the embodiment of the present disclosure.

It is assumed that, in the display input confirmation completion screen in FIG. 12C, a region for displaying an identification name of the display apparatus 2, the fact that the display input confirmation of the display apparatus 2 has been completed, and a selection region of "Connectable Input Display" (IN05) are displayed.

The administrator of the management apparatus 1 confirms a message indicating that the display input confirmation of the display apparatus 2 illustrated in FIG. 12C has been completed, so as to recognize that input types available in the display apparatus 2 have been confirmed.

On the other hand, the selection region of "Connectable Input Display" (IN04) displayed in the region for selecting a function associated with the display input confirmation in FIG. 12B is to be selected when the input types connectable to the display apparatus 2 (the connectable input information) is to be displayed after the display input confirmation process is executed.

When the administrator of the management apparatus 1 desires to view a list of the input types connectable to the display apparatus 2, "Start" in the region IN04 of "Connectable Input Display" is selected.

When "Start" in the region IN04 of "Connectable Input Display" in FIG. 12B is selected, the connectable input list screen shown in FIG. 13A is displayed.

Furthermore, also when "Start" in the region IN05 of "Connectable Input Display" in FIG. 12C is selected, the connectable input list screen shown in FIG. 13A is displayed.

Connectable Input List Screen: FIG. 13A

FIG. 13A is a diagram illustrating an example of a connectable input list screen displayed on the display 13 of the management apparatus 1.

As described above, when "Start" in the region of "Connectable Input Display" in FIGS. 12B and 12C is selected, the connectable input list screen is displayed.

In the connectable input screen in FIG. 13A, a region for displaying the identification name of the display apparatus 2 and a region indicating a list of input types that are connectable to the display apparatus 2 (a connectable input list) are displayed.

For example, in the region of "Connectable Input List" of FIG. 13A, a list of the input types connectable to the display apparatus of "DISP001" is displayed.

When viewing the region of "Connectable Input List," the administrator of the management apparatus 1 recognizes that video input terminals corresponding to 6 input types are available in the display apparatus of "DISP001", and selects one of the 6 input types in an actual selection of a display input.

Furthermore, it is assumed that a selection region of "Display Input Switching" (IN06) is displayed in the connectable input list screen in FIG. 13A.

As with the case of FIG. 12A, when the region IN06 of "Display Input Switching" in FIG. 13A is selected, a display input switching request screen shown in FIG. 13B or FIG. 13C is displayed, and an input type to be connected may be selected to start the connection switching process.

Display Input Switching Request Screen: FIGS. 13B and 13C

The connection input confirmation for the display apparatus 2 is terminated when the connectable input list screen of FIG. 13A is displayed as described above.

Here, a screen displayed when the administrator of the management apparatus 1 selects an input type or a connection device corresponding to a video input terminal used to actually acquire an image after connectable input types of the display apparatus 2 are confirmed will be described.

FIGS. 13B and 13C are diagrams illustrating examples of the display input switching request screen displayed in the display 13 of the management apparatus 1.

In the display input switching request screen in FIG. 13B, a list of input types that are connectable and switchable in the display apparatus 2 is displayed, whereas in the display input switching request screen in FIG. 13C, a list of connection devices 4 that are connectable and switchable in the display apparatus 2 is displayed.

The display input switching request screen shown in FIGS. 13B and 13C is displayed on the display 13 when the region IN02 of "Display Input Switching" is selected and input on the display apparatus function setting screen of FIG. 12A or when the region IN06 of "Display Input Switching" is selected in the connectable input list screen in FIG. 13A.

Since the administrator of the management apparatus 1 views the display input switching request screen in FIG. 13B or FIG. 13C, the administrator of the management apparatus 1 may select an input type that corresponds to a video input terminal from which an image is acquired and that reliably attains successful connection or successful switching.

The display input switching request screen in FIGS. 13B and 13C displays a region IN07 of "Start".

The region IN07 of "Start" is selected when connection switching is actually performed on an input type or the like. For example, in a state in which the display input switching request screen shown in FIG. 13B is displayed, the region IN07 of "Start" is selected after a desired input type is selected from a list display of connectable/switchable input types. By this, the connection switching process is started for switching to a selected one of the input types.

In the connection switching process, a connection request including the selected input type is transmitted to the display apparatus 2.

Since it has been determined that the selected input type is connectable in the connection input confirmation process, the connection process for the connection request is successfully performed in a reliable manner, connection response information including a connection result indicating successful connection is generated, and the connection response to the connection request is returned from the display apparatus 2 to the management apparatus 1.

Alternatively, in a state in which the display input switching request screen shown in FIG. 13C is displayed, the region IN07 of "Start" is selected after the administrator selects a desired connection device 4 from a list display of the connection devices 4 that allow the connection switching. By this, the connection switching process is started for switching to a selected one of the connection devices 4.

Similarly, also in this case, in the connection switching process, a connection request including the input type corresponding to the selected connection device 4 is transmitted to the display apparatus 2.

Since it has been determined that the selected connection device 4 is connected to the video input terminal corresponding to the input type that has been determined to be connectable in the connection input confirmation process, the connection process for the connection request is successfully performed in a reliable manner, connection response information including a connection result indicating successful connection is generated, and the connection response to the connection request is returned from the display apparatus 2 to the management apparatus 1.

When the connection switching process for switching to the selected input type or the selected connection device is terminated, a message, such as "Connection to the selected input type is completed," "Connection switching to the selected input type has been successfully performed," "Connection to the selected connection device is completed," or "Connection switching to the selected connection device has been successfully performed", may be displayed in the display 13.

Example of Connection Input Confirmation Process for Display Apparatus

Here, an example of a communication sequence executed among the management apparatus 1, the display apparatus 2, and the information processing apparatus 3 that are included in the display control system, when the connection input confirmation process is performed for the display apparatus 2 will be described.

When the connection input confirmation process is executed for the display apparatus 2, there are three main possible implementations, and therefore, 3 examples corresponding to the respective implementations will be described.

A first example below is a communication sequence of the connection input confirmation process performed by the management apparatus 1 and the display apparatus 2, a second example is a communication sequence of the connection input confirmation process performed by the information processing apparatus 3 and the display apparatus 2, and a third example is a communication sequence of the connection input confirmation process performed by the information processing apparatus 3, the management apparatus 1, and the display apparatus 2.

Figure 14:
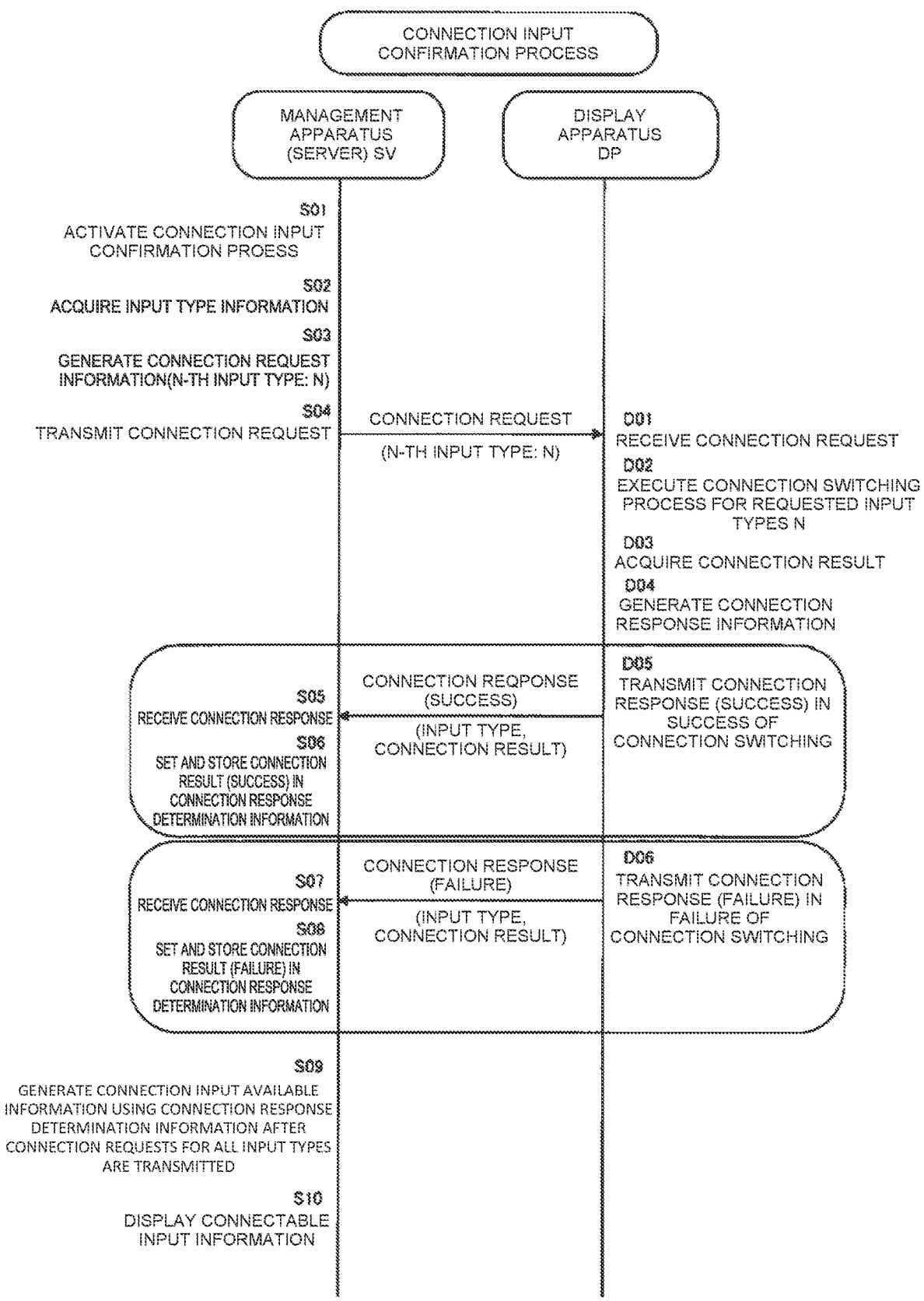
FIG. 14 is a diagram illustrating a communication sequence in a connection input confirmation process performed between the management apparatus and the display apparatus according to the embodiment of the present disclosure.

First Example: Connection Input Confirmation Process by Management Apparatus and Display Apparatus FIG. 14 is a diagram illustrating a communication sequence of the connection input confirmation process performed between the management apparatus 1 and the display apparatus 2.
In the first example, the following situation is assumed. That is, the display apparatus 2 (DP) having different video input terminals to which different connection devices 4 are connected is installed in a place where many unspecified people watch or in a conference room. In the management apparatus 1 (SV) which is installed in a different location from the display apparatus 2, the administrator of the management apparatus 1 selects a video image displayed on the display apparatus 2 (DP) through the network 10 by a remote operation.
In step S01 of the management apparatus SV in FIG. 14, the administrator of the management apparatus 1 performs an input operation for activating the connection input confirmation process.
It is assumed that, in a state in which "Display Apparatus Function Setting Screen" is displayed as shown in FIG. 12A, the administrator selects the region IN01 of "Display Input Confirmation".
As a result, the "display input confirmation screen" shown in FIG. 12B is displayed, and therefore, the administrator selects the region IN03 of "Display Input Confirmation Request" on the display input confirmation screen.
In this selection input, information for specifying the connected display apparatus 2 (DP) (identification information of the display apparatus) is set and input.
By the selection input operation performed as described above, the connection input confirmation process is activated.
In step S02 of the management apparatus SV, the controller 11 of the management apparatus SV obtains the input type information 41 stored in the storage 40. For example, the input type information 41 as illustrated in FIG. 4 is acquired.
In step S03, the connection request transmitter 21 generates the connection request information 42.
For example, the connection request information 42 shown in FIG. 5 is generated using the input type information 41. In a first transmission of a connection request, a first input type set in the input type information 41 is selected, and information corresponding to the selected input type is set in the command name and the connection request input of the connection request information 42.
For example, the connection request information 42 with the command name "INPS001" and the connection request input "DVI-D" is generated using the input type information 41 shown in FIG. 4.
Furthermore, in an N-th transmission of a connection request, an N-th input type N set in the input type information 41 is selected, and information corresponding to the selected input type N is set in the command name and the connection request input of the connection request information 42.

The input type information 41 shown in FIG. 4 includes 10 connection input type names, and therefore, 10 items of connection request information 42 are successively generated and a connection request is transmitted 10 times.
In step S04, a connection request including the generated connection request information 42 is transmitted to the display apparatus DP.
The transmission of a connection request is repeatedly performed a number of times corresponding to the number of input types stored in the input type information 41.
For example, in a first connection request, a connection request including the connection request information 42 with the command name "INPS0001" and the connection request input "DVI-D" is transmitted to the display apparatus DP.
After a connection response to the first connection request is received, a second connection request is transmitted.
According to the input type information 41 shown in FIG. 4, a connection request is repeatedly performed 10 times, and a connection request including the connection request information 42 with a command name "INPS0010" and a connection request information "TV" is transmitted to the display apparatus DP in a 10-th connection request.
In step D01 of the display apparatus DP, a connection request is received.
The connection request information 42 included in the received connection request is checked to recognize the input type N of the connection request.
In step D02, the connection switching processor 55 executes the connection switching process for the requested input type N.
For example, it is determined whether the requested input type N is included in the input terminal information 71 stored in the storage 70, and when the determination is affirmative, an input connection is switched such that a video signal is acquired from a video input terminal corresponding to the input type N.
When the input terminal information 71 shown in FIG. 11 is stored and a connection request with the command name "INPS0001" and the connection request input "DVI-D" is received, the connection is switched to the video input terminal T3 corresponding to the input type "DVI-D" and a video signal is acquired from the connection device 4 connected to the video input terminal T3.
When the requested input type N is included in the input terminal information 71, a connection result indicates success.
However, when the requested input type N is not included in the input terminal information 71, a connection result indicates failure.
Alternatively, when the input connection switching process is executed but an acquisition of a video signal is not detected, a connection result indicates failure.
After the connection switching process is executed as described above, the connection switching confirmer 56 sets and stores "successful connection" or "connection failure" in the connection switching result 73.
In step D03, the connection switching result 73 that has been set and stored is acquired.
In step D04, the connection response generator 57 generates the connection response information 74.
Here, for example, in the case of "successful connection", the connection response information 74 shown in FIG. 6 is generated, whereas in the case of "connection failure", the connection response information 74 shown in FIG. 7 is generated.

In step D05, when the connection switching is successfully performed, the connection response transmitter 58 transmits a connection response including the connection response information 74 corresponding to the connection result "successful connection" to the management apparatus 1.

On the other hand, in step D06, when the connection switching fails, the connection response transmitter 58 transmits a connection response including the connection response information 74 corresponding to the connection result "connection failure" to the management apparatus 1.

In step S05 of the management apparatus 1, the connection response acquirer 22 receives a connection response corresponding to "successful connection".

A connection result of the connection response information 74 included in the received connection response is acquired. In step S06, the connectability determiner 23 determines that the connection is successfully performed by checking the obtained connection result, and sets and stores the connection result ("successful connection") in association with the input type requested to be connected in the connection response determination information 44.

In step S07 of the management apparatus 1, the connection response acquirer 22 receives a connection response corresponding to "connection failure".

A connection result of the connection response information 74 included in the received connection response is acquired. In step S08, the connectability determiner 23 determines that the connection has failed by checking the obtained connection result, and sets and stores the connection result ("connection failure") in association with the input type requested to be connected in the connection response determination information 44.

As described above, for one input type, when step S04 and steps D01 through D04 are executed and the connection is successfully performed, step D05, step S05, and step S06 are executed, whereas when the connection fails, step D06, step S07, and step S08 are executed.

As shown in steps S04 through S08 and steps D01 through D06 above, after communication of a connection request and a transmission response is performed for one input type and a connection result for the input type is set and stored, communication of a connection request and a transmission response for a next input type and a setting and storing of a connection result for the input type are automatically performed in a repeated manner.

For example, when a connection request is transmitted for the 10 input types of the input type information 41 shown in FIG. 4 and a connection result is determined for the 10 input types, the connection response determination information 44 shown in FIG. 8 is set and stored.

After connection requests for all the input types are transmitted in step S09 of the management apparatus 1, the connectable input generator 24 generates the connectable input information 45 using the connection response determination information 44.

For example, the connectable input information 45 shown in FIG. 9 is generated using the connection response determination information 44 shown in FIG. 8.

At this point, a result of confirmation of the connection inputs is determined, and therefore, the display input confirmation completion screen shown in FIG. 12C, for example, may be displayed.

In step S10, a connectable input display corresponding to the connectable input notifier 25 displays the connectable input information 45 on the display 13.

For example, the connectable input display screen shown in FIG. 10A or FIG. 10B is displayed.

In a case where the display input confirmation completion screen shown in FIG. 12C is displayed, when the administrator selects and inputs the region IN05 "Start", the connectable input information 45 is displayed in the display 13.

By the process described above, the administrator of the management apparatus 1 may confirm input types available in the display apparatus 2.

Thereafter, when the administrator selects an image to be displayed in the display apparatus 2 in practice, the administrator may select and input a desired input type or a desired connection device from the displayed connectable input information 45.

In the first example, since the connection input confirmation process is executed between the management apparatus 1 and the display apparatus 2, the administrator of the management apparatus 1 using the display apparatus 2 may easily recognize input types of video input terminals provided in the display apparatus 2 even when the administrator does not know the input types in advance, and accordingly, the administrator may perform connection switching to a video input terminal corresponding to an input type that can be reliably switched thereto and a workload of the administrator of the management apparatus 1 can be reduced since an unrequired operation of performing switching to an input type that causes connection failure is not performed.

Second Example: Connection Input Confirmation Process by Information Processing Apparatus and Display Apparatus In a second example, it is assumed that the display apparatus 2 having the plurality of video input terminals with the different connection devices 4 connected thereto is installed in a conference room, and a moderator or a presenter who is conducting a conference brings his or her own information processing apparatus 3 into the conference room, connects the information processing apparatus 3 and the display apparatus 2 to each other via the network 10, and selects an image displayed on the display apparatus 2 using the information processing apparatus 3 by remote control via the network 10.

It is assumed, as with the management apparatus 1 described above, that the information processing apparatus 3 stores a program for performing the connection input confirmation process and the information processing apparatus 3 functions as the management apparatus 1.

In this situation, the information processing apparatus 3 and the display apparatus 2 directly communicate with each other without using the management apparatus 1, and the same connection input confirmation process as in the first example is performed.

Specifically, in the second example, in the communication sequence of the connection input confirmation process described in the first example with reference to FIG. 14, the processing of the management apparatus 1 is replaced with processing of the information processing apparatus 3.

Since content of the communication sequence of the connection input confirmation process is the same as that in the first example, a description of the communication sequence is omitted.

Also in the second example, since the connection input confirmation process is executed between the information processing apparatus 3 and the display apparatus 2, the moderator who is the owner (the user) of the information processing apparatus 3 using the display apparatus 2 may easily recognize input types of video input terminals provided in the display apparatus 2 even when the administrator does not know the input types, and accordingly, the administrator may perform connection switching to a video input terminal corresponding to an input type that can be reliably switched thereto and a workload of the owner of the information processing apparatus 3 can be reduced since an unrequired operation of performing switching to an input type that causes connection failure is not required to be performed.

Third Example: Connection Input Confirmation Process by Information Processing Apparatus, Management Apparatus, and Display Apparatus FIGS. 15 and 16 are diagrams illustrating a communication sequence of the connection input confirmation process performed between the information processing apparatus 3, the management apparatus 1, and the display apparatus 2.

Figure 15:
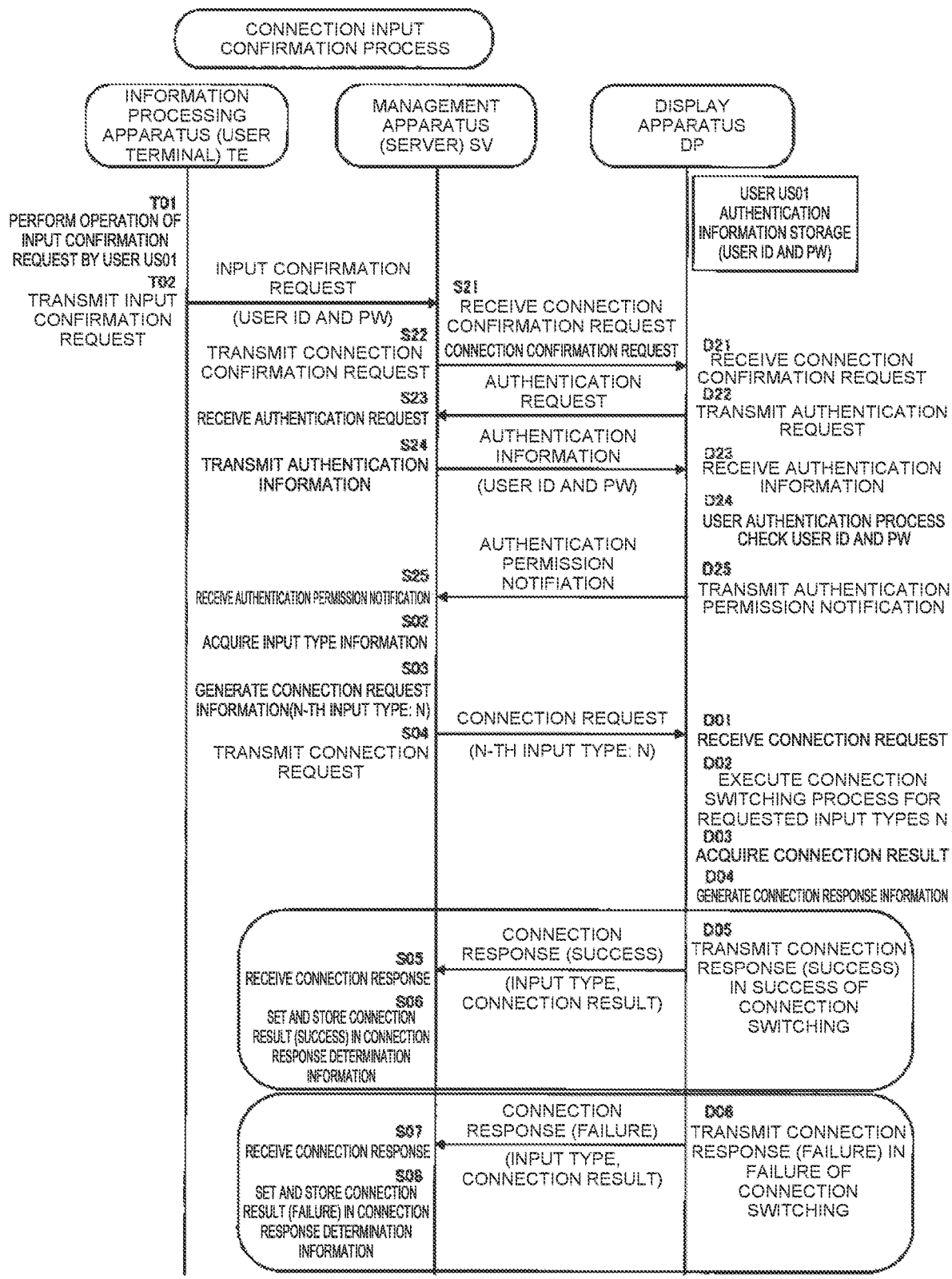
FIG. 15 is a diagram illustrating a communication sequence in a connection input confirmation process performed among an information processing apparatus, the management apparatus, and the display apparatus according to the embodiment of the present disclosure.
Figure 16:
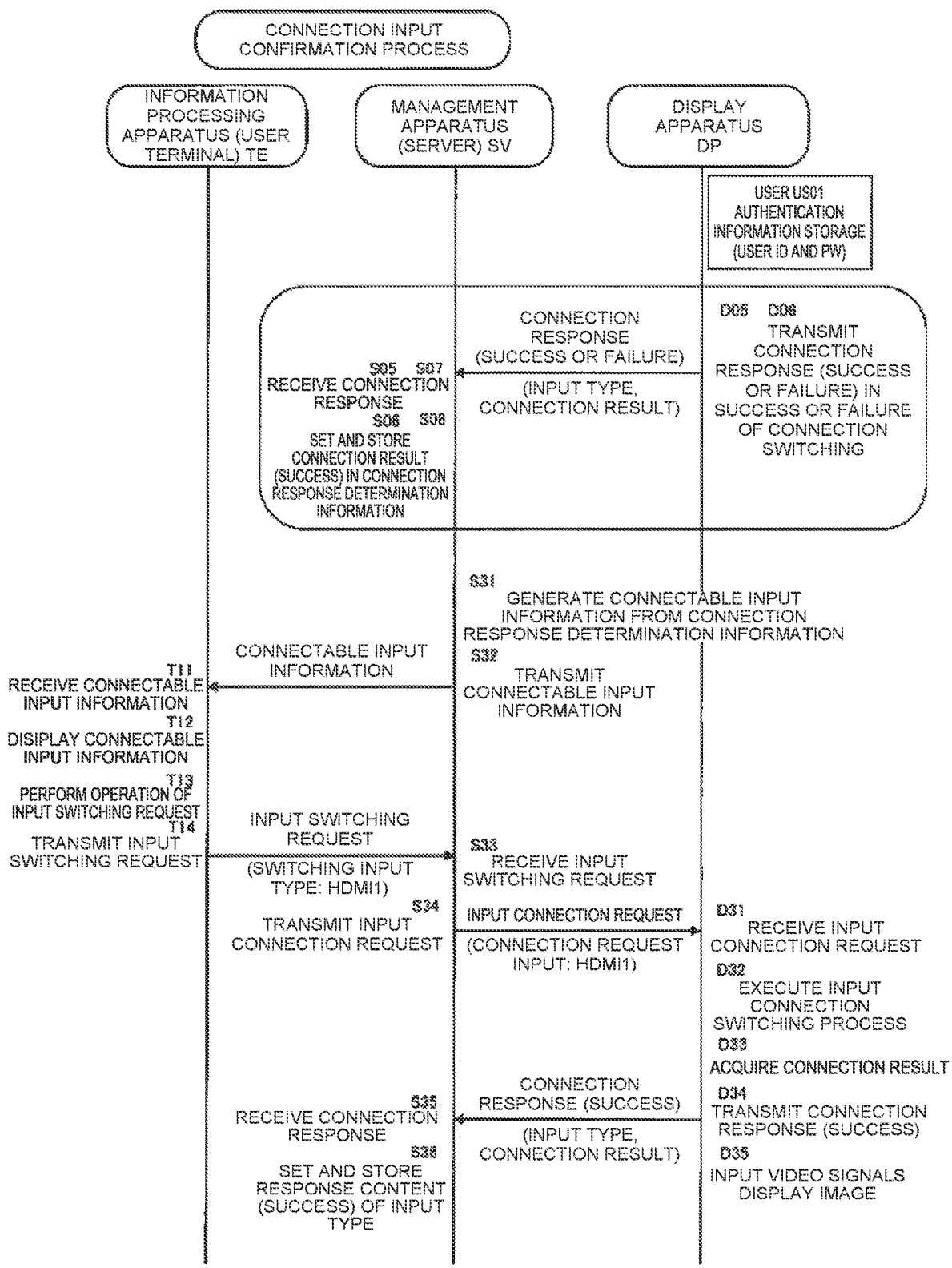
FIG. 16 is a diagram illustrating a communication sequence in a connection input confirmation process performed among the information processing apparatus, the management apparatus, and the display apparatus according to the embodiment of the present disclosure.

In FIGS. 15 and 16, the same numbers as those in FIG. 14 are applied to steps for performing the same processes as those illustrated in FIG. 14 above.

In a third example, it is assumed that the display apparatus 2 having the plurality of video input terminals with the different connection devices 4 connected thereto is installed in a conference room, and a participant of a conference brings own information processing apparatus 3 into the conference room, and connects the management apparatus (SV) 1, the information processing apparatus (TE) 3, and the display apparatus (DP) 2 to one another via the network 10. It is further assumed that the participant (a user) who owns the information processing apparatus 3 is authenticated by the management apparatus 1, and the authenticated user selects an image displayed on the display apparatus 2 using the information processing apparatus 3 by remote control.

In this third example, it is further assumed that all information transmitted and received by the information processing apparatus (TE) 3 is transmitted to and received from the management apparatus (SV) 1, transmission and reception of information relative to the display apparatus (DP) 2 are performed by the management apparatus 1, and only one display apparatus 2 is connected.

Furthermore, it is assumed that authentication information (a user ID and a password PW) associated with the user US01 who is the owner of the information processing apparatus (TE) 3 is stored in the display apparatus 2 in advance.

Note that the management apparatus (SV) 1 may manage the authentication information associated with the user US01.

It is assumed, in step T01 in FIG. 15 performed by the information processing apparatus TE, that the user US01 of the information processing apparatus TE performs an input operation corresponding to an input confirmation request. For example, the user US01 enters identification information (a user ID) and a password PW of the user US01, and then performs a selection input indicating an input confirmation request.

In step T02, the input confirmation request is transmitted to the management apparatus (SV) 3.

The input confirmation request includes the authentication information (the user ID and the password PW) of the user US01.

The management apparatus SV receives the input confirmation request in step S21.

In step S22, a connection confirmation request is transmitted to the display apparatus DP.

In step D21, the display apparatus DP receives the connection confirmation request.

In step D22, an authentication request is transmitted to the management apparatus SV.

The management apparatus SV receives the authentication request in step S23.

In step S24, authentication information is transmitted to the display apparatus DP.

It is assumed that the authentication information includes the authentication information (the user ID and the password PW) of the user US01.

In step D23, the display apparatus DP receives the authentication information.

In step D24, a user authentication process is performed. Here, the received authentication information (the user ID and the password PW) is compared with authentication information (user IDs and passwords PW) stored in the display apparatus DP to determine whether the received authentication information is permissible.

In step D25, when the authentication information is permissible, an authentication permission notification is transmitted to the management apparatus SV.

On the other hand, when the authentication information is not permissible, an authentication impermissible notification is transmitted to the management apparatus SV.

In step S25, the management apparatus SV receives the authentication permission notification or the authentication impermissible notification.

When the authentication permission notification is received, the same process as in FIG. 14 is performed in step S02 of FIG. 15 onwards.

Although not shown in the figure, when the authentication impermissible notification is received, the authentication impermissible notification is transmitted to the information processing apparatus TE.

The information processing apparatus TE that has received the authentication impermissible notification returns to step T01 and performs the authentication process again.

The process in step S02 onwards shown in FIG. 15, that is, the process from step S02 to step S08 performed by the management apparatus SV and the process from step D01 to step D06 performed by the display apparatus DP is the same as those shown in FIG. 14.

Here, the management apparatus SV sequentially transmits connection requests to the display apparatus DP for all the input types included in the input type information 41, receives connection responses including results of the connection switching process performed by the display apparatus DP (connection results: successful connection or connection failure), and stores the connection results of all the input types in the connection response determination information 44.

After performing the process in step S06 or step S08, the management apparatus SV proceeds to step S31 in FIG. 16.

In step S31 of FIG. 16, after connection requests for all the input types are transmitted similarly to step S09, the connectable input generator 24 generates the connectable input information 45 using the connection response determination information 44.

In step S32, the generated connectable input information 45 is transmitted to the information processing apparatus TE.

In step T11, the information processing apparatus TE receives the connectable input information 45.

In step T12, the connectable input information 45 is displayed.

For example, a connectable input list screen shown in FIG. 13A is displayed on the display screen of the information processing apparatus TE.

The connectable input information 45 is included in the connectable input list screen.

The user of the information processing apparatus TE can recognize the input types that are connectable to the display apparatus DP by viewing the display.

Furthermore, when the user of the information processing apparatus TE desires to actually display an image from a desired connection device on the display apparatus DP, the user selects a desired input type from among the input types displayed in the connectable input information 45.

For example, when the user performs a selection input on the region IN06 of "Display Input Switching" in a state in which the connectable input list screen shown in FIG. 13A is displayed on the display screen of the information processing apparatus TE, a display input switching screen shown in FIG. 13B is displayed.

Alternatively, when names of connection devices corresponding to the input types are set and stored, the display input switching request screen shown in FIG. 13C is displayed.

It is assumed, in step T13, that the user of the information processing apparatus TE performs an operation of an input switching request.

Here, for example, in a state in which the display input switching request screen shown in FIG. 13B or FIG. 13C is displayed on the display screen of the information processing apparatus TE, the user selects a desired connectable input or a desired connectable device and then performs a selection input on the region IN07 of "Start".

In step T14, an input switching request is transmitted to the management apparatus SV.

The input switching request includes the connectable input type or the connectable device selected by the user.

For example, when "HDMI1" is selected as the input type to be switched in FIG. 13B, an input switching request including "HDMI1" is transmitted to the management apparatus SV.

The management apparatus SV receives the input switching request in step S33.

In step S34, an input connection request is transmitted to the display apparatus DP.

The input connection request includes the connectable input type or the connectable device selected by the user.

Here, the input connection request transmitted to the display apparatus DP may be the same information as the connection request transmitted to the display apparatus DP in the connection input confirmation process shown in FIG. 14 above.

Specifically, content of the connection request transmitted to the display apparatus DP in the connection input confirmation process and content of the input connection request transmitted to the display apparatus DP in the actual input connection switching may be the same.

In step D31, the display apparatus DP receives the input connection request.

In step D32, the input connection switching process is executed.

The input connection switching process here may be the same as the connection switching process executed in step D02 in the connection input confirmation process in FIG. 14 above.

In this input connection switching process, the input type to be connected is selected from among the input types that are connectable to the display apparatus DP that have already been confirmed, and therefore, the connection is always successfully performed.

In step D33, a connection result is acquired as in step D03 of FIG. 14.

Since the connection is always successfully performed, "successful connection" is acquired as the connection result.

In step D34, after the connection result is generated as in step D04 of FIG. 14, a connection response is transmitted to the management apparatus SV as in step D05.

This connection response includes the input type that is the connection switching target and the connection result (successful connection) as connection response information.

In step D35, since the connection switching is successfully performed, a video signal is input from the connected video input terminal, and an image output from the connection device 4 connected to the video input terminal is displayed on the display panel 60 of the display apparatus 2.

The user of the information processing apparatus TE may confirm that a desired image is displayed by viewing the display screen of the display apparatus DP.

The management apparatus SV receives the connection response in step S35.

In step S36, response content (successful connection) of the input type included in the connection response is set and stored.

The set and stored response content (successful connection) of the input type may be transmitted to the information processing apparatus TE.

Also in the third example, since the user authentication process and the connection input confirmation process are executed among the information processing apparatus (TE) 3, the management apparatus (SV) 1, and the display apparatus (DP) 2, the owner (the user) of the information processing apparatus 3 permitted to use the display apparatus 2 may easily recognize input types of video input terminals provided in the display apparatus 2 even when the user does not know the input types, and accordingly, the user may perform connection switching to a video input terminal corresponding to an input type that can be reliably switched thereto and a workload of the owner of the information processing apparatus 3 can be reduced since an unrequired operation of performing switching to an input type that causes connection failure is not required.

What is claimed is:

1. A display control system including a display apparatus and a management apparatus that are connected to each other through a network, the management apparatus performing a connection switching process on a video signal to be input from at least one connection device connected to the display apparatus to the display apparatus, wherein
   the management apparatus includes
      a connection request transmitter that transmits, for each of individual input types of video signal to be used for display of an image, to the display apparatus, a connection request for requesting acquisition of a video signal corresponding to the input type by the display apparatus,
      a connection response acquirer that acquires a connection response transmitted from the display apparatus in response to the connection request,
      a connectability determiner that determines whether a connection to the display apparatus is available using a connection result included in the acquired connection response for each of the input types of the connection request, and
      a connectable input notifier that makes a notification indicating that a video signal corresponding to an input type determined to be connectable by the connectability determiner is a video signal for an input type that is available in the display apparatus, and the display apparatus includes
- a connection switching processor that executes a connection operation for acquiring a video signal corresponding to an input type requested by a connection request transmitted from the management apparatus,
- a connection switching confirmer that determines whether acquisition of a video signal corresponding to the input type is successfully performed by the executed connection operation, and
- a connection response transmitter that transmits, for each connection request, to the management apparatus, the connection response including a connection result indicating whether acquisition of a video signal is successfully performed that is determined by the connection switching confirmer.

2. The display control system according to claim 1, wherein
the management apparatus includes a storage that stores in advance input type information in which a plurality of input types of a video signal to be used for display of an image performed by the display apparatus are set,
the connection request transmitter sequentially transmits the connection requests corresponding to the input types set in the input type information to the display apparatus,
the connection response acquirer sequentially acquires connection responses returned from the display apparatus in response to the connection requests,
the connectability determiner determines whether the individual input types of a video signal set in advance in the input type information are connectable to the display apparatus, and
a video signal corresponding to an input type determined as connection failure is not informed as a video signal of an input type that is available in the display apparatus.

3. The display control system according to claim 1, wherein
the management apparatus further includes a connectable input generator,
the connectability determiner generates connection response determination information indicating successful connection or connection failure, for each input type requested to be connected, using a connection result included in the acquired connection response,
the connectable input generator generates connectable input information indicating that an input type determined as successful connection as connectable input information indicating the input type connectable to the display apparatus using the connection response determination information, and
the connectable input notifier notifies an administrator of the management apparatus of the connectable input information.

4. The display control system according to claim 3, wherein
the management apparatus further includes an input name setter that sets and changes input types that are connectable in the display apparatus generated as the connectable input information into names of connection devices connected to the video input terminals that are provided in the display apparatus and that correspond to the connectable input types, and when the input types are changed to the names of the connection devices as a setting, the connectable input notifier transmits the connectable input information including names of connection devices instead of the input types.

5. The display control system according to claim 3, wherein
the management apparatus further includes a display, and
the connectable input notifier displays the connectable input information on the display.

6. The display control system according to claim 5, wherein when the connectable input information is displayed on the display, the connectable input information is displayed on the display in a state in which a desired input type corresponding to a video signal to be acquired by the display apparatus or a desired connection device that outputs a video signal to be acquired by the display apparatus is selectable, among the input types or the connection device names included in the displayed connectable input information.

7. The display control system according to claim 3 further including an information processing apparatus connected to the management apparatus via the network, wherein
the connectable input notifier of the management apparatus transmits the connectable input information to the information processing apparatus, and
the information processing apparatus notifies an owner of the information processing apparatus of the received connectable input information.

8. A management apparatus that is connected to a display apparatus through a network and that performs a connection switching process on a video signal to be input to the display apparatus from at least one connection device, the management apparatus comprising:
- a connection request transmitter that transmits, for each of individual input types of video signal to be used for display of an image, to the display apparatus, a connection request for requesting acquisition of a video signal corresponding to the input type by the display apparatus;
- a connection response acquirer that acquires, from the display apparatus, after the connection request is transmitted to the display apparatus, a connection response including a connection result obtained when the display apparatus executes, in response to the connection request, a connection operation for acquiring a video signal corresponding to an input type required by the connection result;
- a connectability determiner that determines whether a connection to the display apparatus is available using the connection result included in the acquired connection response for each input type of the connection request; and
- a connectable input notifier that makes a notification indicating that a video signal corresponding to an input type determined to be connectable, among all input types of the connection requests, is a video signal for an input type that is available in the display apparatus.

9. A display control system including a display apparatus and an information processing apparatus owned by a user of the display apparatus that are connected to each other through a network, the information processing apparatus performing a process of switching a connection of a video signal input from at least one connection device connected to the display apparatus to the display apparatus, wherein
the information processing apparatus includes a connection request transmitter that transmits, for each of individual input types of video signal to be used for display of an image, to the display apparatus, a connection request for requesting acquisition of a video signal corresponding to the input type by the display apparatus, a connection response acquirer that acquires a connection response transmitted from the display apparatus in response to the connection request, a connectability determiner that determines whether a connection to the display apparatus is available using a connection result included in the acquired connection response for each input type of the connection request, and a connectable input notifier that makes a notification indicating that a video signal corresponding to an input type determined to be connectable by the connectability determiner is a video signal for an input type that is available in the display apparatus, and the display apparatus includes a connection switching processor that executes a connection operation for acquiring a video signal corresponding to an input type requested by a connection request transmitted from the information processing apparatus, a connection switching confirmer that determines whether acquisition of a video signal corresponding to the input type is successfully performed by the executed connection operation, and a connection response transmitter that transmits, for each connection request, to the information processing apparatus, the connection response including a connection result indicating whether acquisition of a video signal is successfully performed that is determined by the connection switching confirmer.

10. A display input management method of a display control system that performs connection switching of a video signal to be input to a display apparatus, the display control system including the display apparatus that displays an image of a desired video signal that is selected from among video signals input from one or more connection devices and a management apparatus that performs a connection switching process on a video signal to be input from at least one connection device connected to the display apparatus to the display apparatus, the display input management method comprising:

transmitting, for each of individual input types of video signal to be used for display of an image, by the management apparatus to the display apparatus, a connection request for requesting acquisition of a video signal corresponding to the input type by the display apparatus;

acquiring, by the display apparatus, the connection request;

executing, by the display apparatus, a connection operation for acquiring a video signal corresponding to an input type requested by the connection request transmitted from the management apparatus;

determining, by the display apparatus, whether the acquisition of a video signal corresponding to the input type is successfully performed by the executed connection operation;

transmitting, by the display apparatus to the management apparatus, a connection response including a connection result indicating whether the determined video signal is successfully acquired, for each connection request;

acquiring, by the management apparatus from the display apparatus, a connection response including a connection result obtained as a result of a connection operation performed by the display apparatus from the display apparatus;

determining whether a connection to the display apparatus is available for each input type of the connection request, using a connection result included in the obtained connection response; and making a notification indicating that a video signal corresponding to an input type determined to be connectable, among all input types of the connection requests, is a video signal of an input type that is available in the display apparatus.

* * * * *